United States Patent
Ji et al.

(10) Patent No.: US 9,832,673 B2
(45) Date of Patent: Nov. 28, 2017

(54) ULTRA RELIABLE LINK DESIGN

(71) Applicant: QUALCOMM Incorporated, San Diego, CA (US)

(72) Inventors: Tingfang Ji, San Diego, CA (US); John Edward Smee, San Diego, CA (US); Joseph Soriaga, San Diego, CA (US); Naga Bhushan, San Diego, CA (US); Kambiz Azarian Yazdi, San Diego, CA (US); Krishna Kiran Mukkavilli, San Diego, CA (US); Alexei Yurievitch Gorokhov, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 393 days.

(21) Appl. No.: 14/567,887

(22) Filed: Dec. 11, 2014

(65) Prior Publication Data
US 2016/0029237 A1 Jan. 28, 2016

Related U.S. Application Data

(60) Provisional application No. 62/027,623, filed on Jul. 22, 2014.

(51) Int. Cl.
*H04W 24/10* (2009.01)
*H04W 24/02* (2009.01)
*H04L 5/00* (2006.01)

(52) U.S. Cl.
CPC .......... *H04W 24/10* (2013.01); *H04L 5/0058* (2013.01); *H04W 24/02* (2013.01)

(58) Field of Classification Search
CPC ...... H04W 24/10; H04W 24/02; H04L 5/0058
See application file for complete search history.

(56) References Cited

U.S. PATENT DOCUMENTS

| | | |
|---|---|---|
| 8,675,794 B1 | 3/2014 | Perets et al. |
| 2008/0013610 A1 | 1/2008 | Varadarajan et al. |

(Continued)

FOREIGN PATENT DOCUMENTS

| | | |
|---|---|---|
| CN | 102780547 A | 11/2012 |
| EP | 2337235 A1 | 6/2011 |

(Continued)

OTHER PUBLICATIONS

ISA/EPO, International Search Report and Written Opinion of the International Searching Authority, Int'l. App. No. PCT/US2015/040485, dated Oct. 13, 2015, European Patent Office, Rijswijk, NL, 13 pgs.

*Primary Examiner* — Melvin Marcelo
(74) *Attorney, Agent, or Firm* — Holland & Hart LLP

(57) ABSTRACT

Techniques are described for wireless communication. A first method includes measuring, by a first device, a condition of a wireless channel; and generating at least one channel side information feedback message based on the measured condition of the wireless channel. The at least one channel side information feedback message provides information on a relationship of a set of parameters, including a data rate parameter, an error probability parameter, and at least one of a deadline parameter or a transmission link parameter. A second method includes measuring, by a first device, interference on a wireless channel; identifying an interfering device for the wireless channel based on the measurement; and generating a channel side information feedback message based on the measured interference on the wireless channel. The channel side information feedback message indicates the interfering device for the wireless channel and a correlation of interference from the interfering device with time or frequency.

87 Claims, 20 Drawing Sheets

(56) References Cited

U.S. PATENT DOCUMENTS

| | | |
|---|---|---|
| 2009/0285169 A1 | 11/2009 | Yang et al. |
| 2010/0093287 A1 | 4/2010 | Higuchi et al. |
| 2010/0303183 A1 | 12/2010 | Desai |
| 2010/0304753 A1 | 12/2010 | Furuya |
| 2010/0325521 A1 | 12/2010 | Khisti et al. |
| 2012/0176925 A1 | 7/2012 | Hwang |
| 2012/0218913 A1 | 8/2012 | Park et al. |
| 2012/0307922 A1 | 12/2012 | Simonsson et al. |
| 2013/0003591 A1 | 1/2013 | Novak et al. |
| 2013/0114656 A1 | 5/2013 | Sayana et al. |
| 2013/0203398 A1 | 8/2013 | Callard et al. |
| 2013/0295976 A1 | 11/2013 | Patil et al. |
| 2013/0301432 A1 | 11/2013 | Hammarwall et al. |
| 2013/0301450 A1 | 11/2013 | Geirhofer et al. |
| 2016/0029232 A1* | 1/2016 | Ji .................. H04W 24/08 370/252 |
| 2016/0029394 A1* | 1/2016 | Ji .................. H04W 24/08 370/252 |

FOREIGN PATENT DOCUMENTS

| | | |
|---|---|---|
| EP | 2416619 A1 | 2/2012 |
| EP | 2475126 A1 | 7/2012 |
| EP | 2337235 B1 | 4/2013 |
| WO | WO-2005008831 A2 | 1/2005 |
| WO | WO-2012130313 A1 | 10/2012 |
| WO | WO-2013068282 A1 | 5/2013 |

\* cited by examiner

ULTRA RELIABLE LINK DESIGN

CROSS REFERENCES

The present application for patent claims priority to U.S. Provisional Patent Application No. 62/027,623 by Ji et al., entitled "Ultra Reliable Link Design," filed Jul. 22, 2014, assigned to the assignee hereof, and expressly incorporated by reference herein.

BACKGROUND

Field of Disclosure

Aspects of the present disclosure relate to wireless communications, and specifically to improved channel side information feedback (CSF) reporting.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from the base station to the UE) and uplink channels (e.g., for transmissions from the UEs to the base station). When a receiving device and a transmitting device are communicating over a channel, there is a probability (an error probability) that a given transmission will be lost (e.g., not received or properly decoded by the receiving device).

In some communication systems, a receiving device may provide channel side information feedback (CSF) reports to a transmitting device. The reports may indicate a data rate (e.g., a sustained capacity, such as a sustained data rate or sustained payload size) observed on a wireless channel given a defined error probability (e.g., 10% for a single transmission made at a particular time).

Upon receiving a CSF report, a transmitting device may map a value of a data rate parameter contained in the CSF report to a modulation and coding scheme (MCS) that enables the transmitting device to maintain the defined error probability. Unfortunately, current CSF reporting may not be robust enough for certain mission-critical services (e.g., medical services, industrial-grade services, and/or military services).

SUMMARY

The present disclosure, for example, relates to one or more techniques for improving CSF reporting. The techniques may enable wireless transmission links to be operated with fiber-like link reliability, without sacrificing efficiency. In one set of techniques, CSF reporting may be conditioned on a parameter other than error probability and/or conditioned on multiple parameters. Also, values for a parameter other than data rate may be reported in a CSF report and/or values for multiple parameters may be reported in a CSF report. Furthermore, different parameter values or combinations of parameter values may be reported based on multiple given values for one or more other parameters. In another set of techniques, interference on a wireless channel may be measured, an interfering device responsible for the interference may be identified, and CSF reporting may be modified to include an indication of the interfering device and a correlation of interference from the interfering device with time and/or frequency. In yet another set of techniques, CSF reporting may be modified to indicate a correlation of one or more CSF parameters (e.g., a data rate parameter) with time and/or frequency.

In a first set of illustrative examples, a method for wireless communication is described. In one configuration, the method may include measuring, by a first device, a condition of a wireless channel; generating at least one channel side information feedback message based on the measured condition of the wireless channel, wherein the at least one channel side information feedback message provides information on a relationship of a set of parameters; and transmitting the at least one channel side information feedback message to a second device. The set of parameters may include a data rate parameter, an error probability parameter, and at least one of a deadline parameter or a transmission link parameter, and at least a first parameter of the set of parameters is input to the first device and at least a second parameter of the set of parameters is output conditioned on at least the first parameter. The at least one channel side information feedback message transmitted to the second device may include at least the second parameter.

In some examples of the method, generating the at least one channel side information feedback message may include estimating a value of each parameter in a first subset of the set of parameters based on a given value for each parameter in a remaining subset of the set of parameters. In these examples, the method may include receiving over the wireless channel the given value for at least one parameter of the remaining subset. The method may also or alternatively include determining, by the first device, the given value for at least one parameter of the remaining subset. In some examples, the at least one channel side information feedback message may include an estimated value of at least one parameter of the first subset.

In some examples of the method, the first subset may include the data rate parameter and the remaining subset may include the error probability parameter, the deadline parameter, and the transmission link parameter. In some examples, the first subset may include the error probability parameter and the remaining subset may include the data rate parameter, the deadline parameter, and the transmission link parameter. In some examples, the first subset may include the deadline parameter and the remaining subset may include the error probability parameter, the data rate parameter, and the transmission link parameter. In some examples, the first subset may include the transmission link parameter and the remaining subset may include the error probability parameter, the deadline parameter, and the data rate parameter. In some examples, the first subset may include the data rate parameter and the transmission link parameter, and the remaining subset may include the error probability parameter and the deadline parameter. In some examples, the first subset may include the data rate parameter, the deadline parameter, and the transmission link parameter, and the remaining subset may include the error probability parameter. In some examples, the remaining subset may include the deadline parameter and the value of at least one parameter of the first subset may be estimated for a plurality of different given values of the deadline parameter.

In some examples of the method, the first subset may include the error probability parameter and the value of the error probability parameter may be estimated based on a plurality of different radio links. In some examples, the method may include selecting the plurality of different radio links as a subset of all possible radio links. In some examples, the error probability parameter may be based on simultaneous transmission over the plurality of different radio links.

In some examples of the method, the deadline parameter may correspond to a latency associated with a single retransmission of a signal.

In a second set of illustrative examples, a device for wireless communication is described. In one configuration, the device may include means for measuring a condition of a wireless channel; means for generating at least one channel side information feedback message based on the measured condition of the wireless channel, wherein the at least one channel side information feedback message provides information on a relationship of a set of parameters; and means for transmitting the at least one channel side information feedback message to another device. The set of parameters may include a data rate parameter, an error probability parameter, and at least one of a deadline parameter or a transmission link parameter, and at least a first parameter of the set of parameters is input to the device and at least a second parameter of the set of parameters is output conditioned on at least the first parameter. The at least one channel side information feedback message transmitted to another device may include at least the second parameter. In some examples, the apparatus may further include means for implementing one or more aspects of the method for wireless communication described above with respect to the first set of illustrative examples.

In a third set of illustrative examples, another device for wireless communication is described. In one configuration, the device may include a processor, memory in electronic communication with the processor, and instructions stored in the memory. The instructions may be executable by the processor to measure a condition of a wireless channel; generate at least one channel side information feedback message based on the measured condition of the wireless channel, wherein the at least one channel side information feedback message provides information on a relationship of a set of parameters; and transmit the at least one channel side information feedback message to another device. The set of parameters may include a data rate parameter, an error probability parameter, and at least one of a deadline parameter or a transmission link parameter, and at least a first parameter of the set of parameters is input to the device and at least a second parameter of the set of parameters is output conditioned on at least the first parameter. The at least one channel side information feedback message transmitted to another device may include at least the second parameter. In some examples, the instructions may also be executable by the processor to implement one or more aspects of the method for wireless communication described above with respect to the first set of illustrative examples.

In a fourth set of illustrative examples, a computer program product for communication by a device in a wireless communication system is described. In one configuration, the computer program product may include a non-transitory computer-readable medium storing instructions executable by a processor to cause the device to measure a condition of a wireless channel; generate at least one channel side information feedback message based on the measured condition of the wireless channel, wherein the at least one channel side information feedback message provides information on a relationship of a set of parameters; and transmit the at least one channel side information feedback message to another device. The set of parameters may include a data rate parameter, an error probability parameter, and at least one of a deadline parameter or a transmission link parameter, and at least a first parameter of the set of parameters is input to the device and at least a second parameter of the set of parameters is output conditioned on at least the first parameter. The at least one channel side information feedback message transmitted to another device may include at least the second parameter. In some examples, the instructions may also be executable by the processor to cause the device to implement one or more aspects of the method for wireless communication described above with respect to the first set of illustrative examples.

In a fifth set of illustrative examples, another method of wireless communication is described. In one configuration, the method may include transmitting a wireless signal to a device over a wireless channel; and receiving from the device at least one channel side information feedback message based on a measured condition of the wireless channel, wherein the at least one channel side information feedback message provides information on a relationship of a set of parameters. The set of parameters may include a data rate parameter, an error probability parameter, and at least one of a deadline parameter or a transmission link parameter, and at least a first parameter of the set of parameters is input to the device and at least a second parameter of the set of parameters is output conditioned on at least the first parameter. The at least one channel side information feedback message received from the device may include at least the second parameter.

In some examples of the method, the at least one channel side information feedback message may include an estimated value of each parameter in a first subset of the set of parameters based on a given value for each parameter in a remaining subset of the set of parameters. In these examples, the method may include transmitting to the device an indication of at least one of the first subset or the remaining subset. The method may also or alternatively include transmitting to the device the given value for at least one parameter of the remaining subset. In some examples, the at least one channel side information feedback message may include an estimated value of at least one parameter of the first subset.

In some examples of the method, the first subset may include the data rate parameter and the remaining subset may include the error probability parameter, the deadline parameter, and the transmission link parameter.

In some examples of the method, the first subset may include the error probability parameter and the remaining subset may include the data rate parameter, the deadline parameter, and the transmission link parameter. In some examples, the first subset may include the deadline parameter and the remaining subset may include the error probability parameter, the data rate parameter, and the transmission link parameter. In some examples, the first subset may include the transmission link parameter and the remaining subset may include the error probability parameter, the deadline parameter, and the data rate parameter. In some examples, the first subset may include the data rate parameter and the transmission link parameter, and the remaining subset may include the error probability parameter and the deadline parameter. In some examples, the first subset may include the data rate parameter, the deadline parameter, and the transmission link parameter, and the remaining subset may include the error probability parameter. In some examples, the remaining subset may include the deadline parameter and the value of at least one parameter of the first subset may be estimated for a plurality of different given values of the deadline parameter.

In some examples of the method, the first subset may include the error probability parameter and the value of the error probability parameter may be estimated based on a plurality of different radio links. In some examples, the plurality of different radio links may be a subset of all possible radio links. In some examples, the error probability parameter may be based on simultaneous transmission over the plurality of different radio links.

In some examples of the method, the deadline parameter may correspond to a latency associated with a single retransmission of a signal.

In a sixth set of illustrative examples, another device for wireless communication is described. In one configuration, the device may include means for transmitting a wireless signal to another device over a wireless channel; and means for receiving from the other device at least one channel side information feedback message based on a measured condition of the wireless channel, wherein the at least one channel side information feedback message provides information on a relationship of a set of parameters. The set of parameters may include a data rate parameter, an error probability parameter, and at least one of a deadline parameter or a transmission link parameter, and at least a first parameter of the set of parameters is input to the other device and at least a second parameter of the set of parameters is output conditioned on at least the first parameter. The at least one channel side information feedback message received from the other device may include at least the second parameter. In some examples, the apparatus may further include means for implementing one or more aspects of the method for wireless communication described above with respect to the fifth set of illustrative examples.

In a seventh set of illustrative examples, another device for wireless communication is described. In one configuration, the device may include a processor, memory in electronic communication with the processor, and instructions stored in the memory. In one configuration, the instructions may be executable by the processor to transmit a wireless signal to another device over a wireless channel; and receive from the other device at least one channel side information feedback message based on a measured condition of the wireless channel, wherein the at least one channel side information feedback message provides information on a relationship of a set of parameters. The set of parameters may include a data rate parameter, an error probability parameter, and at least one of a deadline parameter or a transmission link parameter, and at least a first parameter of the set of parameters is input to the other device and at least a second parameter of the set of parameters is output conditioned on at least the first parameter. The at least one channel side information feedback message received from the other device may include at least the second parameter. In some examples, the instructions may also be executable by the processor to implement one or more aspects of the method for wireless communication described above with respect to the fifth set of illustrative examples.

In an eighth set of illustrative examples, another computer program product for communication by a device in a wireless communication system is described. In one configuration, the computer program product may include a non-transitory computer-readable medium storing instructions executable by a processor to cause the device to transmit a wireless signal to another device over a wireless channel; and receive from the other device at least one channel side information feedback message based on a measured condition of the wireless channel, wherein the at least one channel side information feedback message provides information on a relationship of a set of parameters. The set of parameters may include a data rate parameter, an error probability parameter, and at least one of a deadline parameter or a transmission link parameter, and at least a first parameter of the set of parameters is input to the other device and at least a second parameter of the set of parameters is output conditioned on at least the first parameter. The at least one channel side information feedback message received from the other device may include at least the second parameter. In some examples, the instructions may also be executable by the processor to cause the device to implement one or more aspects of the method for wireless communication described above with respect to the fifth set of illustrative examples.

In a ninth set of illustrative examples, another method of wireless communication is described. In one configuration, the method may include measuring, by a first device, interference on a wireless channel; identifying an interfering device for the wireless channel based on the measured interference; generating at least one channel side information feedback message based on the measured interference on the wireless channel, wherein the at least one channel side information feedback message indicates the interfering device for the wireless channel and a correlation of the measured interference from the interfering device with time or frequency; and transmitting the at least one channel side information feedback message to a second device.

In some examples of the method, identifying the interfering device for the wireless channel may include determining that a strength of the measured interference from the interfering device satisfies a threshold. In some examples, the at least one channel side information feedback message may include an identity of the interfering device. In some examples, the method may include estimating a periodicity of the measured interference from the interfering device in time or frequency, and the correlation of the measured interference may include the estimated periodicity. In some examples, the method may include determining a burst duration associated with the measured interference from the interfering device, and the at least one channel side information feedback message may include the burst duration.

In some examples, the method may include decoding a portion of an interference signal, and the burst duration may be determined based on the decoded portion of the interference signal. In some examples, determining the burst duration may include estimating the burst duration based on the measured interference.

In some examples, the method may include predicting an impact to a data rate over the wireless channel when at least one of an interference cancellation operation or a joint detection operation is performed. In these examples, the at least one channel side information feedback message may further indicate a correlation of a residual interference from the interfering device with time or frequency. In some examples, the method may include identifying at least one additional interfering device for the wireless channel based on the measured interference, and the at least one channel side information feedback message may indicate the at least one additional interfering device for the wireless channel and a correlation of the measured interference from the at least one additional interfering device with time or frequency. In some examples, the at least one channel side information feedback message may indicate a correlation between the measured interference from the interfering device and the measured interference from the at least one additional interfering device.

In a tenth set of illustrative examples, another device for wireless communication is described. In one configuration, the device may include means for measuring interference on a wireless channel; means for identifying an interfering device for the wireless channel based on the measured interference; means for generating at least one channel side information feedback message based on the measured interference on the wireless channel, wherein the at least one channel side information feedback message indicates the interfering device for the wireless channel and a correlation of the measured interference from the interfering device with time or frequency; and means for transmitting the at least one channel side information feedback message to another device. In some examples, the apparatus may further include means for implementing one or more aspects of the method for wireless communication described above with respect to the ninth set of illustrative examples.

In an eleventh set of illustrative examples, another device for wireless communication is described. In one configuration, the device may include a processor, memory in electronic communication with the processor, and instructions stored in the memory. The instructions may be executable by the processor to measure interference on a wireless channel; identify an interfering device for the wireless channel based on the measured interference; generate at least one channel side information feedback message based on the measured interference on the wireless channel, wherein the at least one channel side information feedback message indicates the interfering device for the wireless channel and a correlation of the measured interference from the interfering device with time or frequency; and transmit the at least one channel side information feedback message to another device. In some examples, the instructions may also be executable by the processor to implement one or more aspects of the method for wireless communication described above with respect to the ninth set of illustrative examples.

In a twelfth set of illustrative examples, another computer program product for communication by a device in a wireless communication system is described. In one configuration, the computer program product may include a non-transitory computer-readable medium storing instructions executable by a processor to cause the device to measure interference on a wireless channel; identify an interfering device for the wireless channel based on the measured interference; generate at least one channel side information feedback message based on the measured interference on the wireless channel, wherein the at least one channel side information feedback message indicates the interfering device for the wireless channel and a correlation of the measured interference from the interfering device with time or frequency; and transmit the at least one channel side information feedback message to another device. In some examples, the instructions may also be executable by the processor to cause the device to implement one or more aspects of the method for wireless communication described above with respect to the ninth set of illustrative examples.

In a thirteenth set of illustrative examples, another method of wireless communication is described. In one configuration, the method may include transmitting a wireless signal to a device over a wireless channel; and receiving at least one channel side information feedback message from the device, wherein the at least one channel side information feedback message indicates an interfering device for the wireless channel and a correlation of interference from the interfering device with time or frequency.

In some examples, the method may include transmitting to the device an indication of the wireless channel for which the correlation of interference from an interfering device is to be reported. In some examples, the at least one channel side information feedback message may include an identity of the interfering device. In some examples, the at least one channel side information feedback message may include a periodicity of the interference from the interfering device in time or frequency. In some examples, the correlation of the measured interference may include a burst duration of the interference from the interfering device. In some examples, the correlation of the measured interference may include a correlation of residual interference for the interfering device with time and/or frequency.

In some examples of the method, the at least one channel side information feedback message may indicate at least one additional interfering device for the wireless channel and a correlation of the measured interference from the at least one additional interfering device with time or frequency. In some examples of the method, the at least one channel side information feedback message may indicate a correlation between the measured interference from the interfering device and the measured interference from the at least one additional interfering device.

In a fourteenth set of illustrative examples, another device for wireless communication is described. In one configuration, the device may include means for transmitting a wireless signal to another device over a wireless channel; and means for receiving at least one channel side information feedback message from the other device, wherein the at least one channel side information feedback message indicates an interfering device for the wireless channel and a correlation of interference from the interfering device with time or frequency. In some examples, the apparatus may further include means for implementing one or more aspects of the method for wireless communication described above with respect to the thirteenth set of illustrative examples.

In a fifteenth set of illustrative examples, another device for wireless communication is described. In one configuration, the device may include a processor, memory in electronic communication with the processor, and instructions stored in the memory. The instructions may be executable by the processor to transmit a wireless signal to another device over a wireless channel; and receive at least one channel side information feedback message from the other device, wherein the at least one channel side information feedback message indicates an interfering device for the wireless channel and a correlation of interference from the interfering device with time or frequency. In some examples, the instructions may also be executable by the processor to implement one or more aspects of the method for wireless communication described above with respect to the thirteenth set of illustrative examples.

In a sixteenth set of illustrative examples, another computer program product for communication by a device in a wireless communication system is described. In one configuration, the computer program product may include a non-transitory computer-readable medium storing instructions executable by a processor to cause the device to transmit a wireless signal to another device over a wireless channel; and receive at least one channel side information feedback message from the other device, wherein the at least one channel side information feedback message indicates an interfering device for the wireless channel and a correlation of interference from the interfering device with time or frequency. In some examples, the instructions may also be executable by the processor to cause the device to implement one or more aspects of the method for wireless communication described above with respect to the thirteenth set of illustrative examples.

In a seventeenth set of illustrative examples, another method of wireless communication is described. In one configuration, the method may include measuring, by a first device, a condition of a wireless channel; generating at least one channel side information feedback message based on the measured condition of the wireless channel, wherein the at least one channel side information feedback message provides information on at least one parameter correlated with time or frequency; and transmitting the at least one channel side information feedback message to a second device.

In some examples of the method, the at least one parameter may include a data rate parameter. In some examples, the method may include estimating a periodicity of the at least one parameter in time or frequency, and the at least one channel side information feedback message may include the estimated periodicity.

In an eighteenth set of illustrative examples, another device for wireless communication is described. In one configuration, the device may include means for measuring a condition of a wireless channel; means for generating at least one channel side information feedback message based on the measured condition of the wireless channel, wherein the at least one channel side information feedback message provides information on at least one parameter correlated with time or frequency; and means for transmitting the at least one channel side information feedback message to another device. In some examples, the apparatus may further include means for implementing one or more aspects of the method for wireless communication described above with respect to the seventeenth set of illustrative examples.

In a nineteenth set of illustrative examples, another device for wireless communication is described. In one configuration, the device may include a processor, memory in electronic communication with the processor, and instructions stored in the memory. The instructions may be executable by the processor to measure, by a first device, a condition of a wireless channel; generate at least one channel side information feedback message based on the measured condition of the wireless channel, wherein the at least one channel side information feedback message provides information on at least one parameter correlated with time or frequency; and transmit the at least one channel side information feedback message to another device. In some examples, the instructions may also be executable by the processor to implement one or more aspects of the method for wireless communication described above with respect to the seventeenth set of illustrative examples.

In a twentieth set of illustrative examples, another computer program product for communication by a device in a wireless communication system is described. In one configuration, the computer program product may include a non-transitory computer-readable medium storing instructions executable by a processor to cause the device to measure, by a first device, a condition of a wireless channel; generate at least one channel side information feedback message based on the measured condition of the wireless channel, wherein the at least one channel side information feedback message provides information on at least one parameter correlated with time or frequency; and transmit the at least one channel side information feedback message to another device. In some examples, the instructions may also be executable by the processor to cause the device to implement one or more aspects of the method for wireless communication described above with respect to the seventeenth set of illustrative examples.

In a twenty-first set of illustrative examples, another method of wireless communication is described. In one configuration, the method may include transmitting a wireless signal to a device over a wireless channel; and receiving from the device at least one channel side information feedback message based on a measured condition of the wireless channel, wherein the at least one channel side information feedback message provides information on at least one parameter correlated with time or frequency.

In some examples of the method, the at least one parameter may include a data rate parameter. In some examples of the method, the at least one channel side information feedback message may include a periodicity of the at least one parameter in time or frequency.

In a twenty-second set of illustrative examples, another device for wireless communication is described. In one configuration, the device may include means for transmitting a wireless signal to a device over a wireless channel; and means for receiving from the device at least one channel side information feedback message based on a measured condition of the wireless channel, wherein the at least one channel side information feedback message provides information on at least one parameter correlated with time or frequency. In some examples, the apparatus may further include means for implementing one or more aspects of the method for wireless communication described above with respect to the twenty-first set of illustrative examples.

In a twenty-third set of illustrative examples, another device for wireless communication is described. In one configuration, the device may include a processor, memory in electronic communication with the processor, and instructions stored in the memory. The instructions may be executable by the processor to transmit a wireless signal to a device over a wireless channel; and receive from the device at least one channel side information feedback message based on a measured condition of the wireless channel, wherein the at least one channel side information feedback message provides information on at least one parameter correlated with time or frequency. In some examples, the instructions may also be executable by the processor to implement one or more aspects of the method for wireless communication described above with respect to the twenty-first set of illustrative examples.

In a twenty-fourth set of illustrative examples, another computer program product for communication by a device in a wireless communication system is described. In one configuration, the computer program product may include a non-transitory computer-readable medium storing instructions executable by a processor to cause the device to transmit a wireless signal to a device over a wireless channel; and receive from the device at least one channel side information feedback message based on a measured condition of the wireless channel, wherein the at least one channel side information feedback message provides information on at least one parameter correlated with time or frequency. In some examples, the instructions may also be executable by the processor to cause the device to implement one or more aspects of the method for wireless communication described above with respect to the twenty-first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
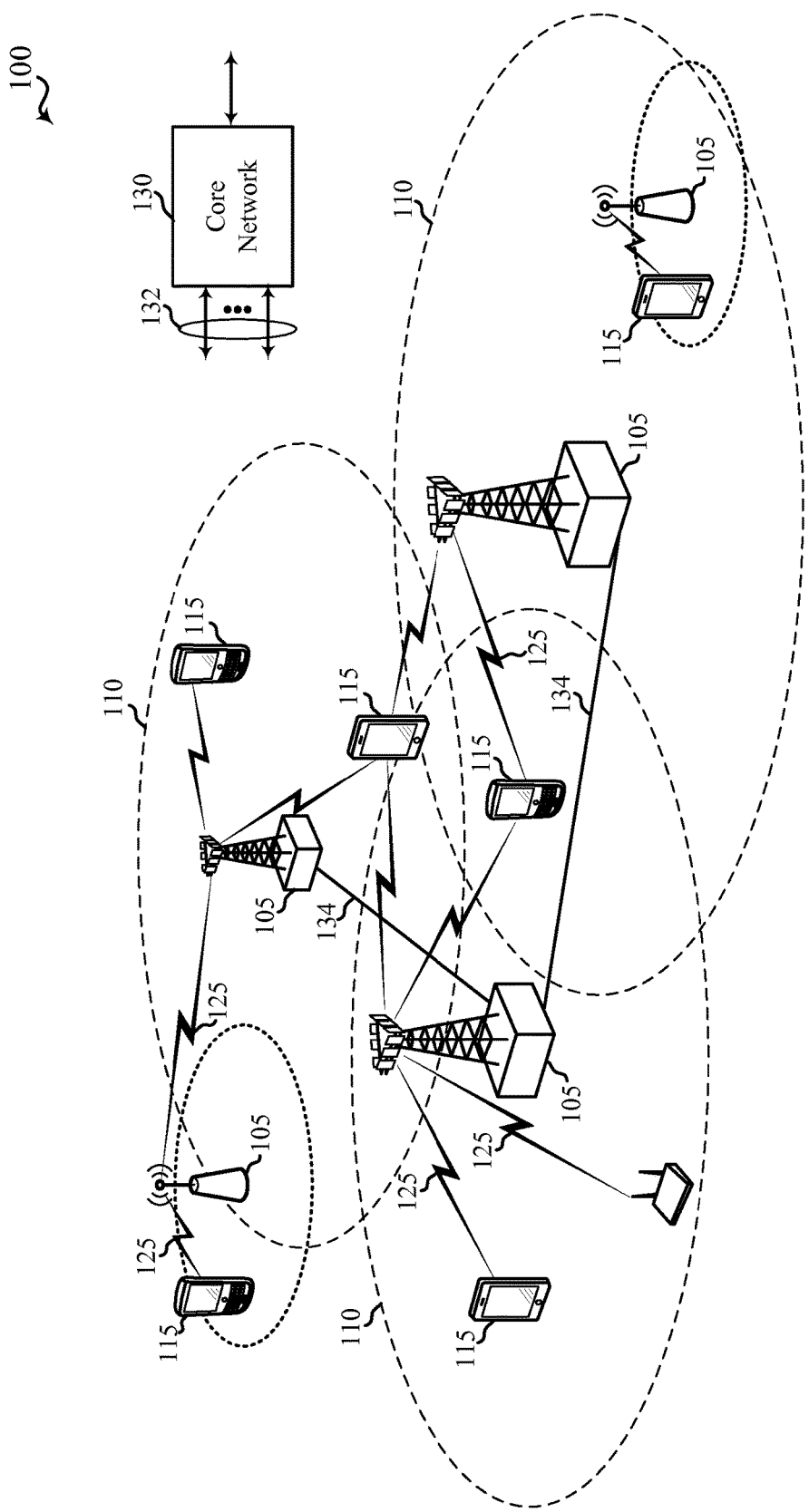
FIG. 1 shows a diagram of a wireless communication system, in accordance with various aspects of the present disclosure.

Techniques are described for improving CSF reporting. When a receiving device and a transmitting device are communicating over a channel, there is a probability (an error probability) that a given transmission will be lost (e.g., not received or properly decoded by the receiving device). In current multiple-access communication systems, such as LTE/LTE-A communication systems, a receiving device may provide CSF reports to a transmitting device. The reports may indicate a data rate observed on a wireless channel given a defined error probability. In an LTE/LTE-A communication system, the error probability is defined in the 3GPP specification as 10%, for a single transmission made at a particular time. However, a 10% error probability may not be satisfactory for some services. Alternatively, or additionally, some services may find other parameters of importance. Current CSF reporting is directed toward maximizing spectral efficiency and/or sustained (average) capacity. However, some services may be interested in other outcomes. For example, a service may want to know what data rate can be achieved given a defined error probability, a variable latency or deadline (e.g., a deadline of one millisecond or one signal retransmission), and individual ones or a combination of transmission links (e.g., a 2 GHz transmission link and a 5 GHz transmission link). As another example, a service may want to know what error probability can be achieved given different data rates.

A transmitting device may also find it useful to receive, via CSF reporting, the identity of a device that is interfering with a wireless channel, as well as a correlation of interference from the interfering device with time and/or frequency. A transmitting device may also find it useful to receive, via CSF reporting, a correlation of a parameter such as a data rate with time and/or frequency. Such time and/or frequency correlated information may enable a transmitting device to predict one or more CSF parameters. In one example, such a prediction may enable a transmitting device to temper its response to a temporary burst in interference that substantially increases the percentage of non-acknowledgements (NAKs) received by a transmitting device.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless transmission links. The wireless communication system 100 may support operation on multiple transmission links or carriers (waveform signals of different frequencies). Multi-carrier transmitters can transmit modulated signals simultaneously on the multiple carriers. For example, each transmission link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., 51 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of transmission links 125 or channels (i.e., component carriers), with each channel using a component carrier between the UE 115 and one of a number of cells (e.g., serving cells, which cells may in some cases be operated by the same or different base stations 105).

The transmission links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions.

As discussed previously, most existing cellular systems implement rate control procedures in which a receiving device (e.g., a UE 115) reports channel side information to a transmitting device (e.g., a base station 105) for a given error probability over reference measurement resources. For example, a UE 115 may transmit a projected data rate R to a base station 105 based on channel conditions observed at the UE 115 and a given estimated error probability P (e.g., 10% block error rate). Upon receiving the projected data rate R, the base station 105 may determine a modulation and coding scheme (MCS) adapted to transmit at or near the projected data rate R.

One issue with the existing framework is that the base station 105 may not have enough information to select an MCS that accounts for different target error rates or different latency targets. For example, when the base station 105 targets a very low error probability (e.g., less than 10%), it may be useful to use asymmetric step sizes and/or high transmission redundancy in the presence of bursty interference. But it can be difficult or impossible to deduce when such conditions exist using channel side information under existing reporting schemes. Additionally, existing methods of rate prediction do not account for the use of multiple transmission links, and may therefore provide inaccurate rate predictions in the channel side information reported to the transmitting device.

In light of these and other issues, one or more of the UEs 115 or other devices of FIG. 1 may generate channel side information feedback messages that provide information on a relationship between a data rate parameter, an error probability parameter, a deadline parameter and/or a transmission link parameter. The information feedback messages may include an estimated value for one or more of the parameters based on assumed or given values for the remaining parameters. The addition of the deadline parameter and/or the transmission link parameter to the channel side information feedback messages may provide the base station 105 receiving the messages with a better picture of the channel conditions observed by the UEs 115, and allow the base stations 105 to select MCS and other transmission schemes to account for a wider variety of channel conditions and application requests.

Additionally or alternatively, one or more of the UEs 115 or other devices of FIG. 1 may transmit channel side information feedback messages to a base station 105 that identify an interfering device for a wireless channel and correlate measured interference from the interfering device with time or frequency. In this way, the base station 105 may identify and predict interference trends by the identified interfering device when selecting MCS and other communication schemes and resource allocation for communicating with a UE 115. For example, the base station 105 may select a lower order MCS or higher transmission power for communications with the UE 115 when interference from the interfering device is likely to occur. Additionally or alternatively, the base station 105 may avoid scheduling communication with the UE 115 when interference from the interfering device is likely to occur.

Figure 2:
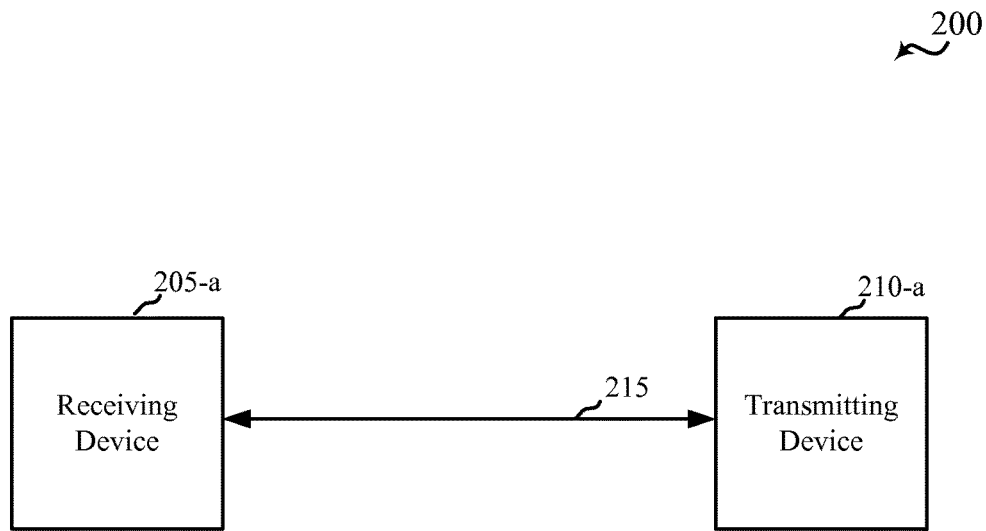
FIG. 2 shows a diagram of a wireless communication system, in accordance with various aspects of the present disclosure.

FIG. 2 shows a diagram of a wireless communication system 200, in accordance with various aspects of the present disclosure. The wireless communication system 200 may include a receiving device 205-a and a transmitting device 210-a. In some examples, the receiving device 205-a may be an example of one or more aspects of the UEs 115 described with reference to FIG. 1. In some examples, the transmitting device 210-a may be an example of one or more aspects of the base stations 105 described with reference to FIG. 1.

As shown, the receiving device 205-a and transmitting device 210-a may communicate over a single transmission link 215. As discussed above, the receiving device 205-a may provide channel side information feedback messages to the transmitting device 210-a. In some examples, the channel side information feedback messages may provide information on a relationship between a data rate parameter, an error probability parameter, a deadline parameter and/or a transmission link parameter. The information feedback messages may include an estimated value for one or more of the parameters based on assumed or given values for the remaining parameters. Additionally or alternatively, the information feedback messages may identify an interfering device for a wireless channel and correlate measured interference from the interfering device with time or frequency.

Using the information provided by the receiving device 205-a in the channel side information feedback messages, the transmitting device 210-a may select a MCS or other transmission scheme for transmissions to the receiving device 205-a. The transmitting device 210-a may also schedule transmissions to the receiving device 205-a over time or frequency resources based on the received channel side information feedback messages.

Figure 3:
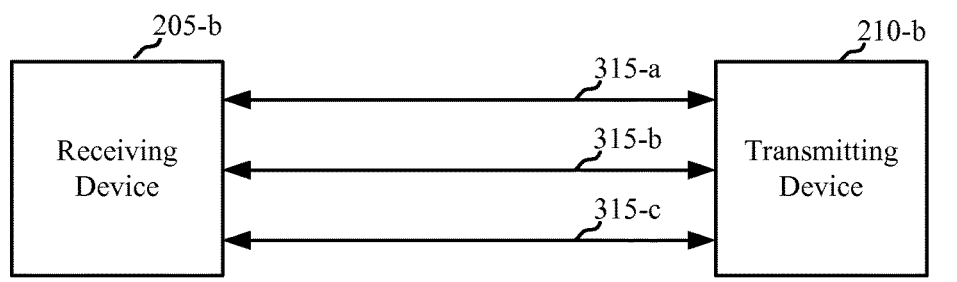
FIG. 3 shows a diagram of a wireless communication system, in accordance with various aspects of the present disclosure.

FIG. 3 shows a diagram of a wireless communication system 300, in accordance with various aspects of the present disclosure. The wireless communication system 300 may include a receiving device 205-b and a transmitting device 210-b. In some examples, the receiving device 205-b may be an example of one or more aspects of the UEs 115 described with reference to FIG. 1, and/or one or more aspects of the receiving device 205-a described with reference to FIG. 2. In some examples, the transmitting device 210-b may be an example of one or more aspects of the base stations 105 described with reference to FIG. 1, and/or one or more aspects of the transmitting device 210-b described with reference to FIG. 2.

As shown, the receiving device 205-b and transmitting device 210-b may communicate over multiple transmission links 315-a, 315-b, and 315-c. Although three transmission links 315 are shown, the receiving device and transmitting device 210-b may communicate over any number of transmission links.

In some examples, a receiving device 205 may be able to adaptively communicate with a transmitting device 210 over a single transmission link, as shown in FIG. 2, or over multiple transmission links 315, as shown in FIG. 3. As described above with respect to the systems 100, 200 of FIGS. 1-2, the receiving device 205-b of FIG. 3 may provide channel side information feedback messages to the transmitting device 210-b. In some examples, the channel side information feedback messages may provide information on a relationship between a data rate parameter, an error probability parameter, a deadline parameter and/or a transmission link parameter. The information feedback messages may include an estimated value for one or more of the parameters based on assumed or given values for the remaining parameters. Additionally or alternatively, the information feedback messages may identify an interfering device for a wireless channel and correlate measured interference from the interfering device with time or frequency. The transmitting device 210-b may use the information in the channel side information feedback messages to adaptively control transmissions to the receiving device 205-b.

Using the information provided by the receiving device 205-b in the channel side information feedback messages, the transmitting device 210-b may select a MCS or other transmission scheme for transmissions to the receiving device 205-b. The transmitting device 210-a may also schedule transmissions to the receiving device 205-b over time or frequency resources based on the received channel side information feedback messages.

Figure 4:
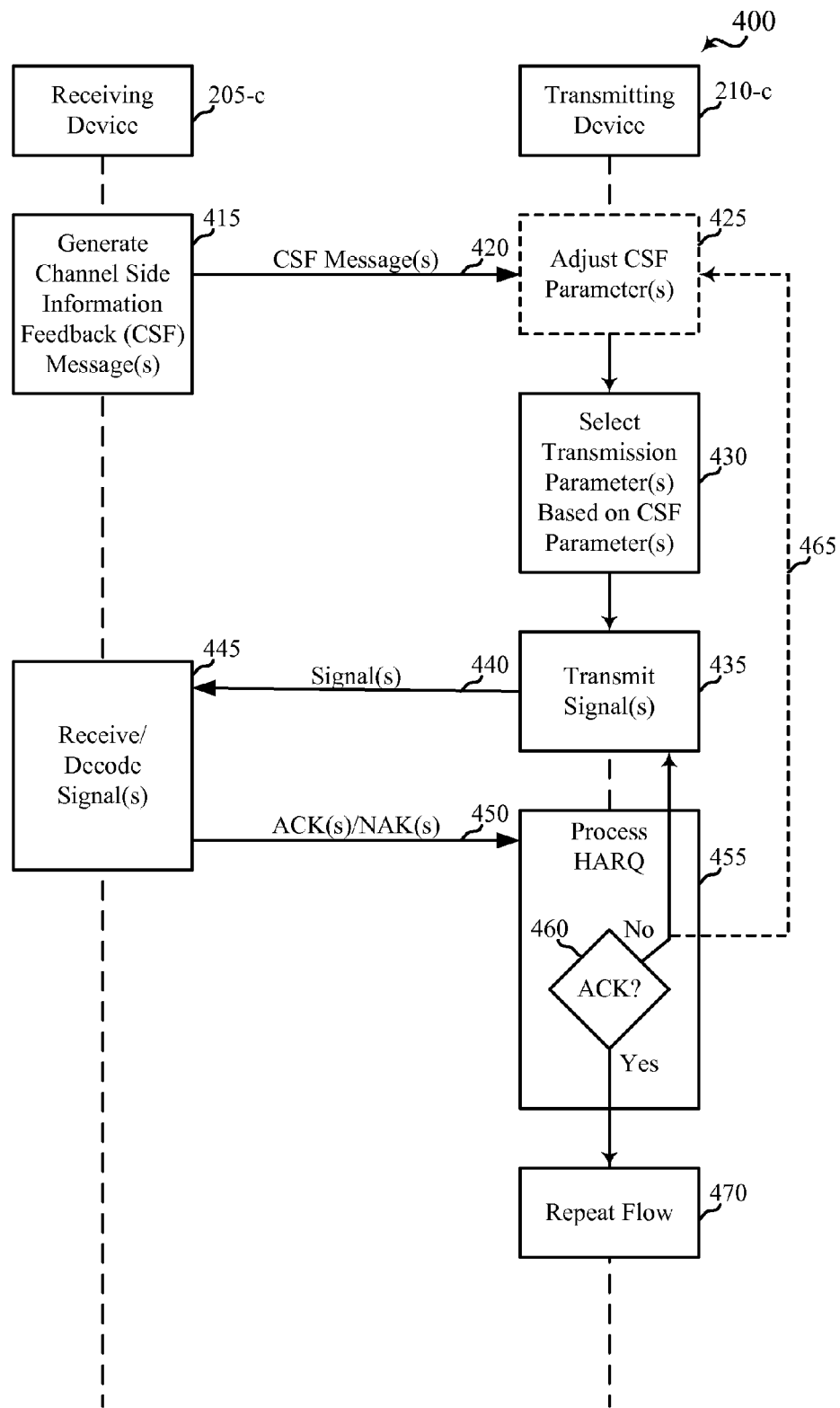
FIG. 4 illustrates an example message flow between a receiving device and a transmitting device, in accordance with various aspects of the present disclosure.

FIG. 4 illustrates an example message flow 400 between a receiving device 205-c and a transmitting device 210-c, in accordance with various aspects of the present disclosure. In some examples, the receiving device 205-c (e.g., a wireless device) may be an example of one or more aspects of the UEs 115 described with reference to FIG. 1, and/or one or more aspects of the receiving devices 205 described with reference to FIGS. 2 and/or 3. In some examples, the transmitting device 210-c (e.g., a wireless device) may be an example of one or more aspects of the base stations 105 described with reference to FIG. 1, and/or one or more aspects of the transmitting devices 210 described with reference to FIGS. 2 and/or 3.

The message flow 400 may be performed in an iterative manner and may begin, for example, at block 415 or block 435. At block 415, the receiving device 205-c may generate at least one channel side information feedback (CSF) message 420 for transmission to the transmitting device 210-c. The at least one CSF message may be generated, for example, based on a measured condition of a wireless channel. In some cases, the condition of the wireless channel may be measured by the receiving device 205-c. In some cases, the wireless channel may include a wireless channel over which one or more of the messages shown in FIG. 4 are transmitted.

The at least one CSF message may provide information on a relationship of a set of parameters. By way of example, the set of parameters may include a data rate (R) parameter, an error probability (P) parameter, and at least one of a deadline (T) parameter or a transmission link (L) parameter. The data rate (R) parameter and error probability (P) parameter may similar to the data rate (R) parameter and error probability (P) parameter already discussed. The deadline parameter may indicate, for example, a time or number of transmission attempts (e.g., a latency) for completing a signal transmission. The transmission link parameter may indicate, for example, an identity of one or more transmission links or a number of transmission links.

Generating the at least one CSF message may include estimating a value of each parameter in a first subset of the set of parameters based on a given value for each parameter in a remaining subset of the set of parameters. In other words, a relationship may be established such that the given value for each parameter in the remaining subset specifies a condition under which the value of each parameter in the first subset is estimated. In some examples, at least a first parameter of the first subset of the parameters may be input to the receiving device 205-c and at least a second parameter of the remaining subset of parameters may be output conditioned on at least the first parameter. In such cases, the at least one CSF message 420 transmitted to the transmitting device 210-c may include at least the second parameter which is the output to the receiving device 205-c. In some cases, a given value for a parameter in the remaining subset of parameters may be received from the transmitting device 210-c and/or over the wireless channel for which the condition is measured. In some cases, a given value for a parameter in the remaining subset of parameters may be independently determined (or configured) by the receiving device 205-c. One useful value of the deadline parameter can be the latency associated with a single retransmission of a signal. In some cases, a value of the deadline parameter may be based on a traffic type (and values of the deadline parameter may vary for different traffic types).

The estimated value of at least one parameter in the first subset may be provided to the transmitting device 210-c in the at least one CSF message, as part or all of the information on the relationship of the set of parameters. The given value of one or more parameter in the remaining subset may also be provided to the transmitting device 210-c in the at least one CSF message, as part of the information on the relationship of the set of parameters, or in another message (especially when a given value is determined by the receiving device 205-c or otherwise unknown to the transmitting device 210-c).

Parameters may be assigned to the first subset or the remaining subset by the transmitting device 210-c and/or the receiving device 205-c. Under a first-order conditioning or reporting, one parameter may be included in the first subset and one or more other parameters may be included in the remaining subset (e.g., a {first subset|remaining subset} may be defined as: {R|P, T, L}, {L|P, T, R}, {T|P, R, L}, or {P|R, T, L}). Under a second-order conditioning or reporting, two parameters may be included in the first subset and one or more other parameters may be included in the remaining subset (e.g., {R, L|P, T}, {R, P|T, L}, {R, T|P, L}, {P, T|R, L}, {P, L|R, T}, or {T, L|P, R}). Under a third-order conditioning or reporting, three parameters may be included in the first subset and one or more other parameters may be included in the remaining subset (e.g., {R, P, T|L}, {R, P, L|T}, {R, T, L|P}, {P, T, L|R}).

In some examples, a plurality of different values may be given for at least one parameter in the remaining subset, and a value of each parameter in the first subset may be estimated for each different value (or when the remaining subset includes multiple parameters, for each different combination of values). For example, the first subset may include the data rate parameter, the error probability parameter, and/or the transmission link parameter, and the remaining subset may include the deadline parameter. In this example, a plurality of values may be given for the deadline parameter, and the value of each parameter in the first subset may be estimated for each given value of the deadline parameter. In another example, the first subset may include the error probability parameter and the remaining subset may include the transmission link parameter. In this example, a plurality of different transmission links (e.g., radio links) may be indicated for the transmission link parameter, and the value of the error probability parameter may be estimated for each of the indicated transmission links. Also or alternatively, a value of the error probability parameter may be estimated based on simultaneous transmission over a plurality of transmission links (e.g., in a carrier aggregation mode). The plurality of different transmission links may include all possible transmission links or a selected subset of all possible transmission links.

Upon receipt of the at least one CSF message 420 at the transmitting device 210-c, the transmitting device 210-c may perform different operations, depending on how the transmitting device 210-c is configured. In some alternatives, the transmitting device 210-c may be configured with or without the HARQ feedback path 465 and block 425. When the transmitting device 210-c is configured with the HARQ feedback path 465 and block 425, the transmitting device 210-c may determine whether to adjust one or more CSF parameters (e.g., an R, P, T, and/or L parameter) received via the at least one CSF message 420. For example, one or more CSF parameters may be adjusted based on HARQ feedback indicating whether information provided in one or more previously-received CSF messages is deemed correct or incorrect by the transmitting device 210-c. For example, the value of a data rate parameter may be increased when HARQ feedback indicates that transmission acknowledgements (ACKs) are being received at a greater rate than CSF feedback suggests. Similarly, the value of a data rate parameter may be decreased when HARQ feedback indicates that transmission non-acknowledgements (NAKs) are being received at a greater rate than CSF feedback suggests. Adjusted and/or non-adjusted CSF parameters may then be used at block 430. When the transmitting device 210-c is configured without the HARQ feedback path 465 and block 425, CSF parameters included in the at least one CSF message 420 may be used directly at block 430.

At block 430, one or more CSF parameters may be used to select one or more transmission parameters. In some examples, the transmission parameters may include a modulation and coding scheme (MCS), a number of transmission links, and/or identified transmission links.

At block 435, the transmission parameters selected at block 430, and possibly other transmission parameters, may be used to transmit one or more wireless signals 440 to the receiving device 205-c over a wireless channel. The wireless signal(s) 440 may in some cases be transmitted as part of one or more frames, subframes, and/or packets. In some cases, the wireless signal(s) 440 may include one or more messages for configuring the CSF reporting of the receiving device 205-c. For example, the one or more messages may indicate which parameters are assigned to the first subset and the remaining subset, and may indicate the given value or values of one or more parameters in the remaining subset.

The transmitted signal(s) 440 may be received and decoded by the receiving device 205-c, and an ACK or NAK 450 indicating whether each signal 440 (or group of signals) is successfully decoded may be transmitted by the receiving device 205-c to the transmitting device 210-c.

At block 455, hybrid automatic repeat request (HARQ) processing may be performed. When an ACK is not received for a signal (or group of signals), the HARQ processing may trigger a retransmission of the signal at block 435. In some cases, a signal may be retransmitted using one or more different transmission parameters. In other cases, a signal may be retransmitted using previously used transmission parameters. When an ACK 460 is received for a signal (or group of signals), the HARQ processing may allow processing to proceed to block 470, where the message flow 400 or parts thereof may be repeated.

Figure 5:
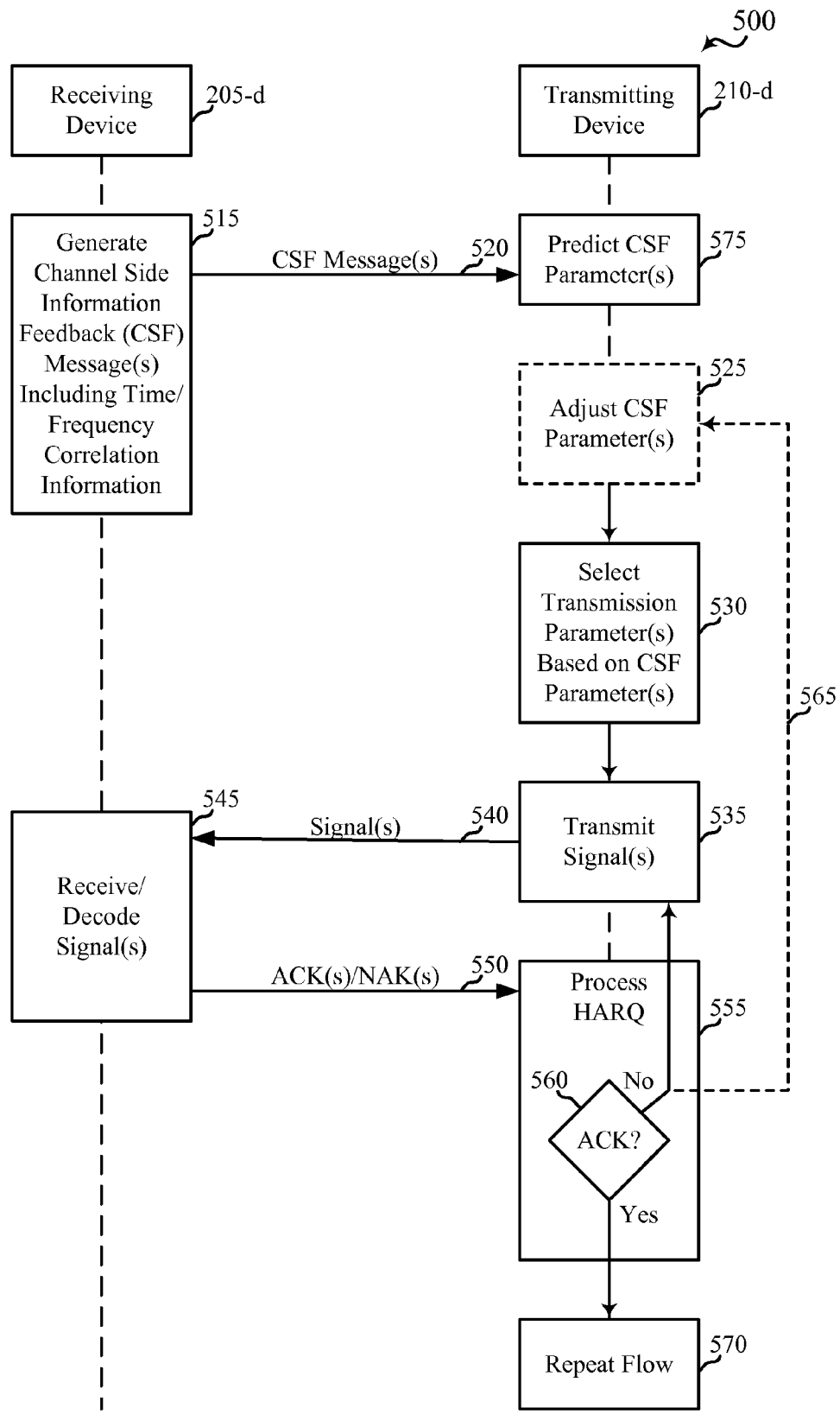
FIG. 5 illustrates an example message flow between a receiving device and a transmitting device, in accordance with various aspects of the present disclosure.

FIG. 5 illustrates an example message flow 500 between a receiving device 205-d and a transmitting device 210-d, in accordance with various aspects of the present disclosure. In some examples, the receiving device 205-d (e.g., a wireless device) may be an example of one or more aspects of the UEs 115 described with reference to FIG. 1, and/or one or more aspects of the receiving devices 205 described with reference to FIGS. 2, 3, and/or 4. In some examples, the transmitting device 210-d (e.g., a wireless device) may be an example of one or more aspects of the base stations 105 described with reference to FIG. 1, and/or one or more aspects of the transmitting devices 210 described with reference to FIGS. 2, 3, and/or 4.

The message flow 500 may be performed in an iterative manner and may begin, for example, at block 515 or block 535. At block 515, the receiving device 205-d may generate at least one channel side information feedback (CSF) message 520 for transmission to the transmitting device 210-d. The at least one CSF message may be generated, for example, based on a measured interference on a wireless channel. In some cases, the wireless channel on which interference is measured may include a wireless channel over which one or more of the messages shown in FIG. 5 are transmitted. In some cases, an interfering device (e.g., a dominant interferer) for the wireless channel may be identified based on the measured interference. In some cases, at least one additional interfering device for the wireless channel may be identified based on the measured interference. In some cases, it may be determined that a strength of the interference from the interfering device satisfies a threshold.

In some cases, the interference may be measured in absolute terms (e.g., in dBm) or in relative terms (e.g., dB compared to serving cell signal strength). In some cases, the interference on the wireless channel may be measured by the receiving device 205-d.

The at least one CSF message may indicate the interfering device for the wireless channel and a correlation of interference from the interfering device with time and/or frequency. The correlation of the interference with time may include an estimated periodicity of the interference from the interfering device. The correlation with frequency may include, for example, a correlation of the interference with a subband, frequency carrier, and/or frequency band. In some cases, the at least one CSF message may include an identity of the interfering device.

In some examples, the at least one CSF message may also indicate the at least one additional interfering device for the wireless channel and a correlation of interference from the at least one additional interfering device with time and/or frequency. The at least one CSF message may also indicate a correlation between the measured interference from the interfering device and the measured interference from the at least one additional interfering device.

The correlation with time may also or alternatively include a burst duration associated with the interference from the interfering device. In some examples, the burst duration may be determined by decoding a portion of an interference signal and determining the burst duration from the decoded portion of the interference signal (e.g., the burst duration may be explicitly signaled in the interference signal). In some examples, the burst duration may be estimated based on the measured interference.

In some cases, the receiving device 205-d may predict an impact to a data rate over the wireless channel when at least one of an interference cancellation operation or a joint detection operation is performed, and indicate in the at least one CSF message a correlation of a residual interference from the interfering device with time and/or frequency.

Upon receipt of the at least one CSF message 520 at the transmitting device 210-d, the transmitting device 210-d may use the correlation of interference from the interfering device with time and/or frequency, at block 575, to predict one or more CSF parameters. Then, the transmitting device 210-d may perform different operations that depend on how the transmitting device 210-d is configured. In one configuration, the transmitting device 210-d may be configured with the HARQ feedback path 565 and block 525. In this configuration, the transmitting device 210-d may determine whether to adjust one or more of the predicted CSF parameters (e.g., an R, P, T, and/or L parameter). For example, a predicted CSF parameter may be adjusted based on HARQ feedback indicating whether information provided in one or more previously-received CSF messages is deemed correct or incorrect by the transmitting device 210-d. For example, the value of a predicted data rate parameter may be increased when HARQ feedback indicates that transmission acknowledgements (ACKs) are being received at a greater rate than CSF feedback suggests. Similarly, the value of a data rate parameter may be decreased when HARQ feedback indicates that transmission non-acknowledgements (NAKs) are being received at a greater rate than CSF feedback suggests. Adjusted and/or non-adjusted CSF parameters may then be used at block 530. When the transmitting device 210-d is configured without the HARQ feedback path 565 and block 525, predicted CSF parameters may be used directly at block 530.

At block 530, one or more CSF parameters may be used to select one or more transmission parameters. In some examples, the transmission parameters may include an MCS, a number of transmission links, and/or identified transmission links.

At block 535, the transmission parameters selected at block 530, and possibly other transmission parameters, may be used to transmit one or more wireless signals 540 to the receiving device 205-d over a wireless channel. The wireless signal(s) 540 may in some cases be transmitted as part of one or more frames, subframes, and/or packets. In some cases, the wireless signal(s) 540 may include one or more messages for configuring the CSF reporting of the receiving device 205-d. For example, the one or more messages may indicate the wireless channel for which the correlation of interference from an interfering device is to be reported.

The transmitted signal(s) 540 may be received and decoded by the receiving device 205-d, and an ACK or NAK 550 indicating whether each signal 540 (or group of signals) is successfully decoded may be transmitted by the receiving device 205-d to the transmitting device 210-d.

At block 555, HARQ processing may be performed. When an ACK is not received for a signal (or group of signals), the HARQ processing may trigger a retransmission of the signal at block 535. In some cases, a signal may be retransmitted using one or more different transmission parameters. In other cases, a signal may be retransmitted using previously used transmission parameters. When an ACK 560 is received for a signal (or group of signals), the HARQ processing may allow processing to proceed to block 570, where the message flow 500 or parts thereof may be repeated.

In a variation of the message flow described with reference to FIG. 5, the at least one CSF message may indicate a correlation of at least one CSF parameter (e.g., a data rate parameter) with time and/or frequency. The correlation with frequency may include, for example, a correlation of the at least one CSF parameter with a subband, frequency carrier, and/or frequency band. The at least one CSF message may also include an estimated periodicity of the at least one CSF parameter in time and/or frequency.

Figure 6:
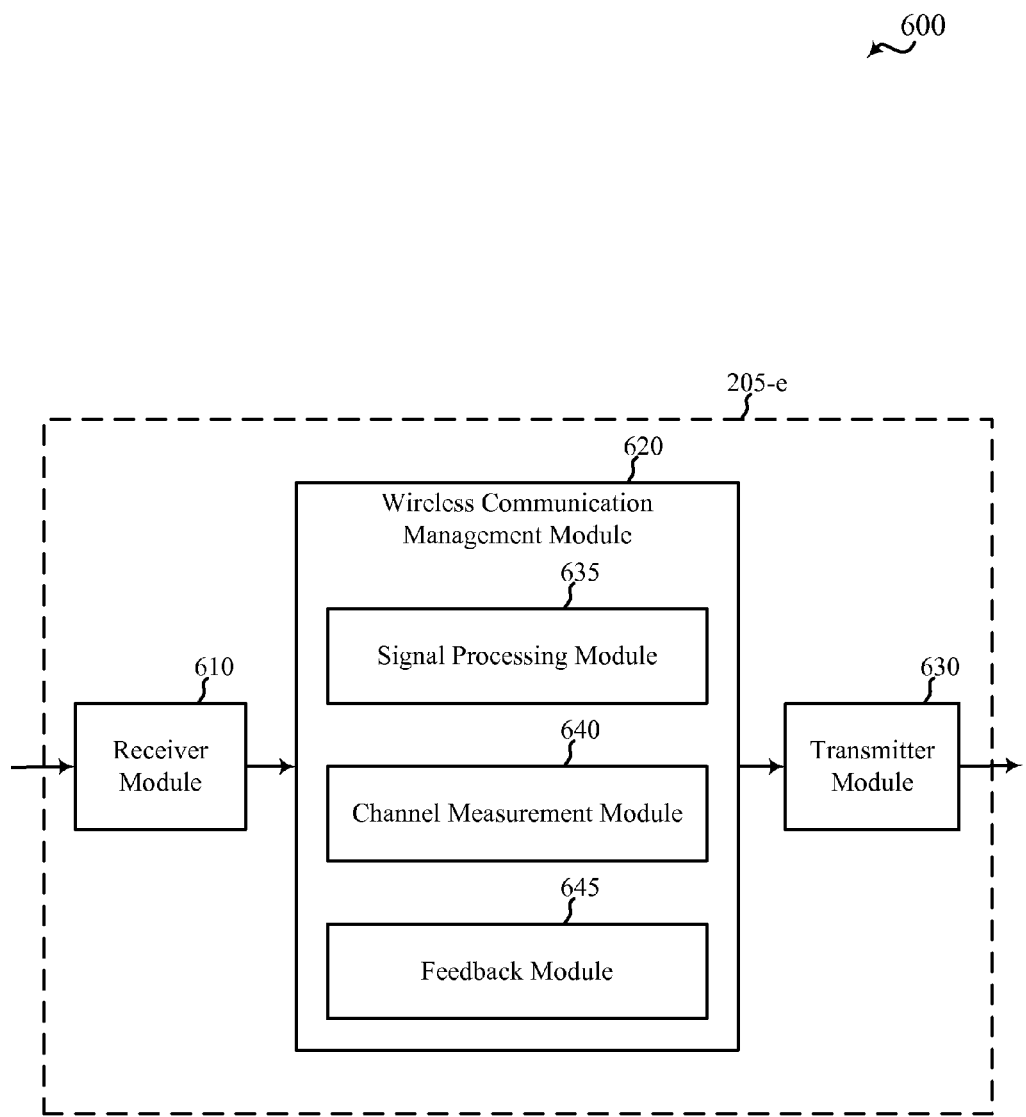
FIG. 6 shows a block diagram of a receiving device for use in wireless communication, in accordance with various aspects of the present disclosure.

FIG. 6 shows a block diagram 600 of a receiving device 205-e (e.g., a wireless device) for use in wireless communication, in accordance with various aspects of the present disclosure. In some examples, the receiving device 205-e may be an example of aspects of one or more of the UEs 115 described with reference to FIG. 1, and/or aspects of one or more of the receiving devices 205 described with reference to FIGS. 2, 3, 4, and/or 5. The receiving device 205-e may also be a processor. The receiving device 205-e may include a receiver module 610, a wireless communication management module 620, and/or a transmitter module 630. Each of these components may be in communication with each other.

The components of the receiving device 205-e may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over at least one radio frequency spectrum band. In some examples, the at least one radio frequency spectrum band may be used for LTE/LTE-A communications, as described, for example, with reference to FIGS. 1, 2, and/or 3. The receiver module 610 may be used to receive various types of data and/or control signals (i.e., transmissions) over one or more transmission links of a wireless communication system, such as one or more transmission links of the wireless communication system 100, 200, and/or 300 described with reference to FIGS. 1, 2, and/or 3.

In some examples, the transmitter module 630 may include at least one RF transmitter, such as at least one RF transmitter operable to transmit over at least one radio frequency spectrum band. In some examples, the at least one radio frequency spectrum band may be used for LTE/LTE-A communications, as described, for example, with reference to FIGS. 1, 2, and/or 3. The transmitter module 630 may be used to transmit various types of data and/or control signals (i.e., transmissions) over one or more transmission links of a wireless communication system, such as one or more transmission links of the wireless communication system 100, 200, and/or 200 described with reference to FIGS. 1, 2, and/or 3.

The wireless communication management module 620 may take different forms and may be used to manage wireless communications of the receiving device 205-e. In some examples, the wireless communication management module 620 may include a signal processing module 635, a channel measurement module 640, and/or a feedback module 645. Each of these components may be in communication with each other.

In some examples, the signal processing module 635 may be used to process signals received and decoded via the receiver module 610. The signals may be received over a wireless channel from a transmitting device. In some cases, the signals may be received as part of one or more frames, subframes, and/or packets. In some cases, the signals may include one or more messages for configuring the CSF reporting of the receiving device 205-e.

In some examples, the channel measurement module 640 may be used to measure a condition of a wireless channel over which the signals processed by the signal processing module 635 are received. The channel measurement module 640 may also or alternatively be used to measure interference on the wireless channel. In some cases, the interference may be measured in absolute terms (e.g., in dBm) or in relative terms (e.g., dB compared to serving cell signal strength). The channel measurements may be provided to the feedback module 645.

In some examples, the feedback module 645 may be used to generate at least one CSF message based on the measured condition of the wireless channel. The at least one CSF message may provide information on a relationship of a set of parameters. By way of example, the set of parameters may include a data rate parameter, an error probability parameter, and at least one of a deadline parameter or a transmission link parameter.

In some examples, the feedback module 645 may also or alternatively be used to generate at least one CSF message based on the measured interference on the wireless channel. In these examples, the at least one CSF message may indicate an interfering device for the wireless channel and a correlation of interference from the interfering device with time and/or frequency.

The feedback module 645 may also be used to manage transmission of the at least one CSF message to another device. The at least one CSF message may be transmitted via the transmitter module 630.

Figure 7:
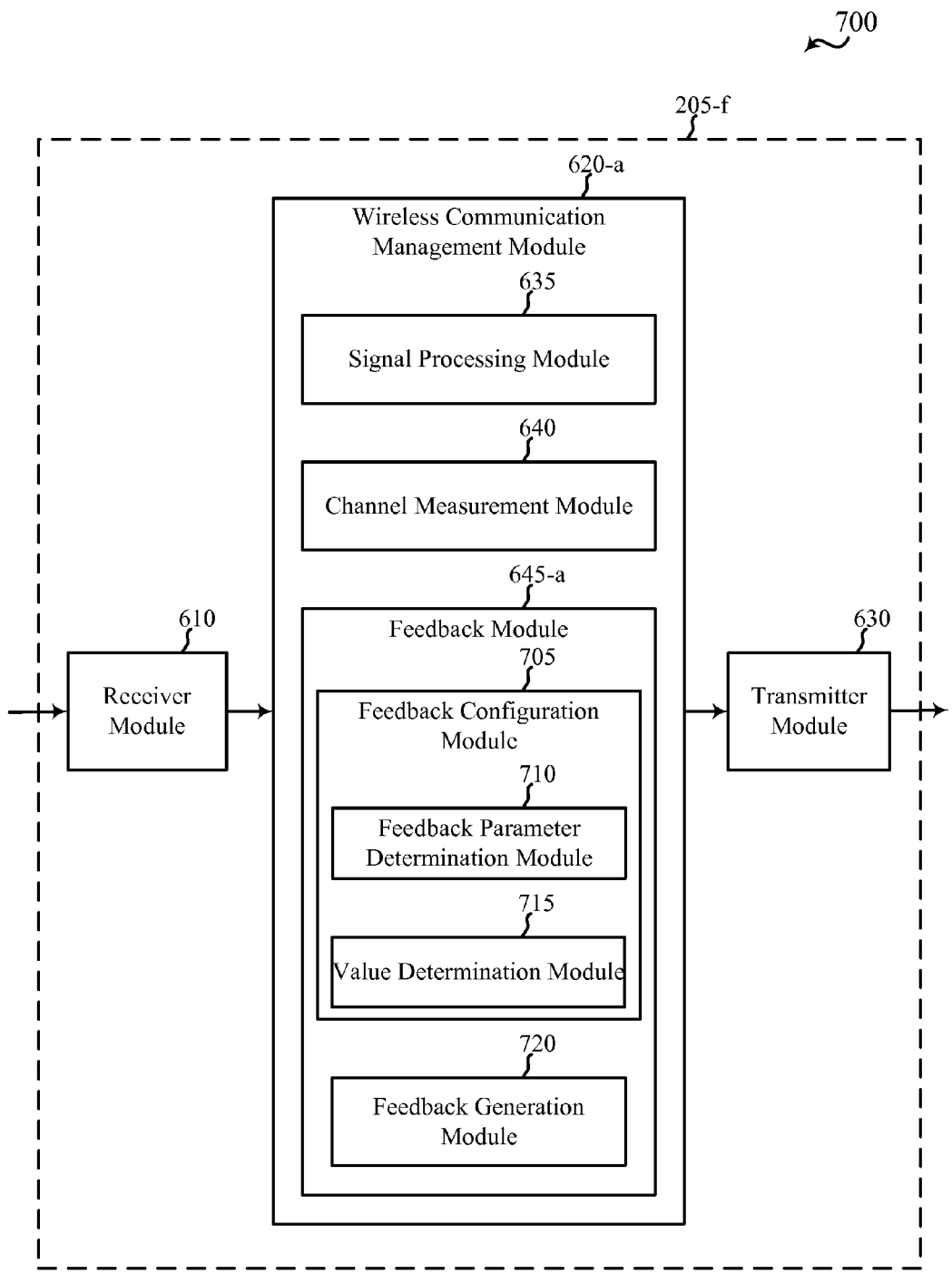
FIG. 7 shows a block diagram of a receiving device for use in wireless communication, in accordance with various aspects of the present disclosure.

FIG. 7 shows a block diagram 700 of a receiving device 205-f (e.g., a wireless device) for use in wireless communication, in accordance with various aspects of the present disclosure. In some examples, the receiving device 205-f may be an example of aspects of one or more of the UEs 115 described with reference to FIG. 1, and/or aspects of one or more of the receiving devices 205 described with reference to FIGS. 2, 3, 4, 5, and/or 6. The receiving device 205-f may also be a processor. The receiving device 205-f may include a receiver module 610, a wireless communication management module 620-a, and/or a transmitter module 630. Each of these components may be in communication with each other.

The components of the receiving device 205-f may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 and transmitter module 630 may be configured similarly to the receiver module 610 and transmitter module 630 described with reference to FIG. 6.

The wireless communication management module 620-a may take different forms and may be used to manage wireless communications of the receiving device 205-f. In some examples, the wireless communication management module 620-a may include a signal processing module 635, a channel measurement module 640, and/or a feedback module 645-a. Each of these components may be in communication with each other.

In some examples, the signal processing module 635 and channel measurement module 640 may be configured similarly to the signal processing module 635 and channel measurement module 640 described with reference to FIG. 6.

In some examples, the feedback module 645-a may include a feedback configuration module 705 and/or a feedback generation module 720. The feedback generation module 720 may be used to generate at least one CSF message based on the measured condition of the wireless channel received from the channel measurement module 640. The at least one CSF message may provide information on a relationship of a set of parameters. By way of example, the set of parameters may include a data rate parameter, an error probability parameter, and at least one of a deadline parameter or a transmission link parameter. In some examples, the at least one CSF message may be generated as described with reference to FIG. 4.

The feedback generation module 720 may also be used to manage transmission of at least one CSF message to another device. The at least one CSF message may be transmitted via the transmitter module 630.

The feedback configuration module 705 may be used to configure the parameters for which CSF will be generated. In some examples, the feedback configuration module 705 may include a feedback parameter determination module 710 and a value determination module 715. In some examples, the feedback parameter determination module 710 may be used to determine a first subset of the set of parameters and a remaining subset of the set of parameters. A value of each parameter in the first subset may be estimated based on a given value for each parameter in the remaining subset. In some cases, the first subset and the remaining subset may be determined based on information (e.g., a configuration) received from another device (e.g., from a transmitting device and/or base station).

In some examples, the value determination module 715 may be used to determine a given value for each parameter in the remaining subset of parameters. In some cases, a given value may be received from another device (e.g., from a transmitting device and/or base station). In some cases, a given value for a parameter in the remaining subset of parameters may be independently determined (or configured) by the receiving device 205-f.

Figure 8:
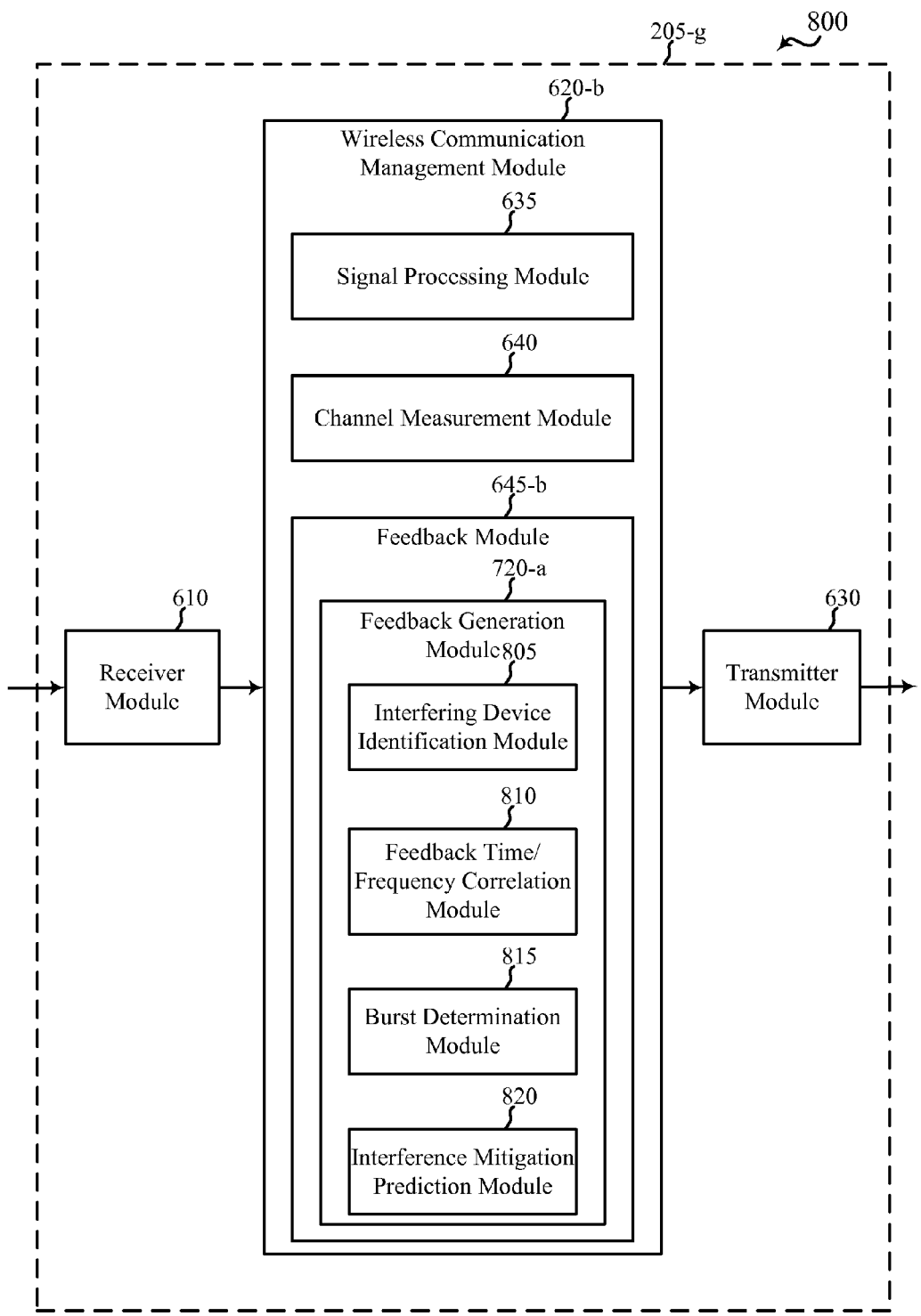
FIG. 8 shows a block diagram of a receiving device for use in wireless communication, in accordance with various aspects of the present disclosure.

FIG. 8 shows a block diagram 800 of a receiving device 205-g (e.g., a wireless device) for use in wireless communication, in accordance with various aspects of the present disclosure. In some examples, the receiving device 205-g may be an example of aspects of one or more of the UEs 115 described with reference to FIG. 1, and/or aspects of one or more of the receiving devices 205 described with reference to FIGS. 2, 3, 4, 5, 6, and/or 7. The receiving device 205-g may also be a processor. The receiving device 205-g may include a receiver module 610, a wireless communication management module 620-b, and/or a transmitter module 630. Each of these components may be in communication with each other.

The components of the receiving device 205-g may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 and transmitter module 630 may be configured similarly to the receiver module 610 and transmitter module 630 described with reference to FIG. 6.

The wireless communication management module 620-b may take different forms and may be used to manage wireless communications of the receiving device 205-g. In some examples, the wireless communication management module 620-b may include a signal processing module 635, a channel measurement module 640, and/or a feedback module 645-b. Each of these components may be in communication with each other.

In some examples, the signal processing module 635 and channel measurement module 640 may be configured similarly to the signal processing module 635 and channel measurement module 640 described with reference to FIG. 6.

In some examples, the feedback module 645-b may include a feedback generation module 720-a. The feedback generation module 720-a may be used to generate at least one CSF message based on the interference measured by the channel measurement module 640. In some cases, the feedback generation module 720-a may include an interfering device identification module 805, a feedback time/frequency correlation module 810, a burst determination module 815, an interference mitigation prediction module 820.

In some examples, the interfering device identification module 805 may be used to identify an interfering device (e.g., a dominant interferer) for the wireless channel. The interfering device may be identified based on the measured interference. In some cases, it may be determined whether a strength of the interference from the interfering device satisfies a threshold. In some cases, the feedback generation module 720-a may include an identity of the interfering device for the wireless channel in the at least one CSF message.

In some examples, the feedback time/frequency correlation module 810 may be used to correlate the interference from the interfering device with time and/or frequency. The correlation of the interference with time may include an estimated periodicity of the interference from the interfering device. The correlation of the interference with frequency may include, for example, a correlation of the interference with a subband, frequency carrier, and/or frequency band. The feedback generation module 720-a may include the correlation in the at least one CSF message.

In some examples, the interfering device identification module 805 may also be used to identify at least one additional interfering device for the wireless channel based on the measured interference. In these examples, the feedback time/frequency correlation module 810 may also be used to correlate the interference from each of the at least one additional interfering device with time and/or frequency. The feedback time/frequency correlation module 810 may also be used to indicate a correlation between the measured interference from the interfering device and the measured interference from the at least one additional interfering device.

The correlation with time may also or alternatively include a burst duration associated with the interference from the interfering device. The burst duration may be determined by the burst determination module 815. In some examples, the burst duration may be determined by decoding a portion of an interference signal and determining the burst duration from the decoded portion of the interference signal (e.g., the burst duration may be explicitly signaled in the interference signal). In some examples, the burst duration may be estimated based on the measured interference.

In some cases, the interference mitigation prediction module 820 may be used to predict an impact to a data rate over the wireless channel when at least one of an interference cancellation operation or a joint detection operation is performed. The feedback generation module 720-a may then indicate, in the at least one CSF message, a correlation of a residual interference from the interfering device with time and/or frequency.

The feedback generation module 720-a may also be used to manage transmission of at least one CSF message to another device. The at least one CSF message may be transmitted via the transmitter module 630.

In a variation of the receiving device 205-g described with reference to FIG. 8, the at least one CSF message may indicate a correlation of at least one CSF parameter (e.g., a data rate parameter) with time and/or frequency. The correlation with frequency may include, for example, a correlation of the at least one CSF parameter with a subband, frequency carrier, and/or frequency band. The at least one CFS message may also include an estimated periodicity of the at least one CSF parameter in time and/or frequency.

Figure 9:
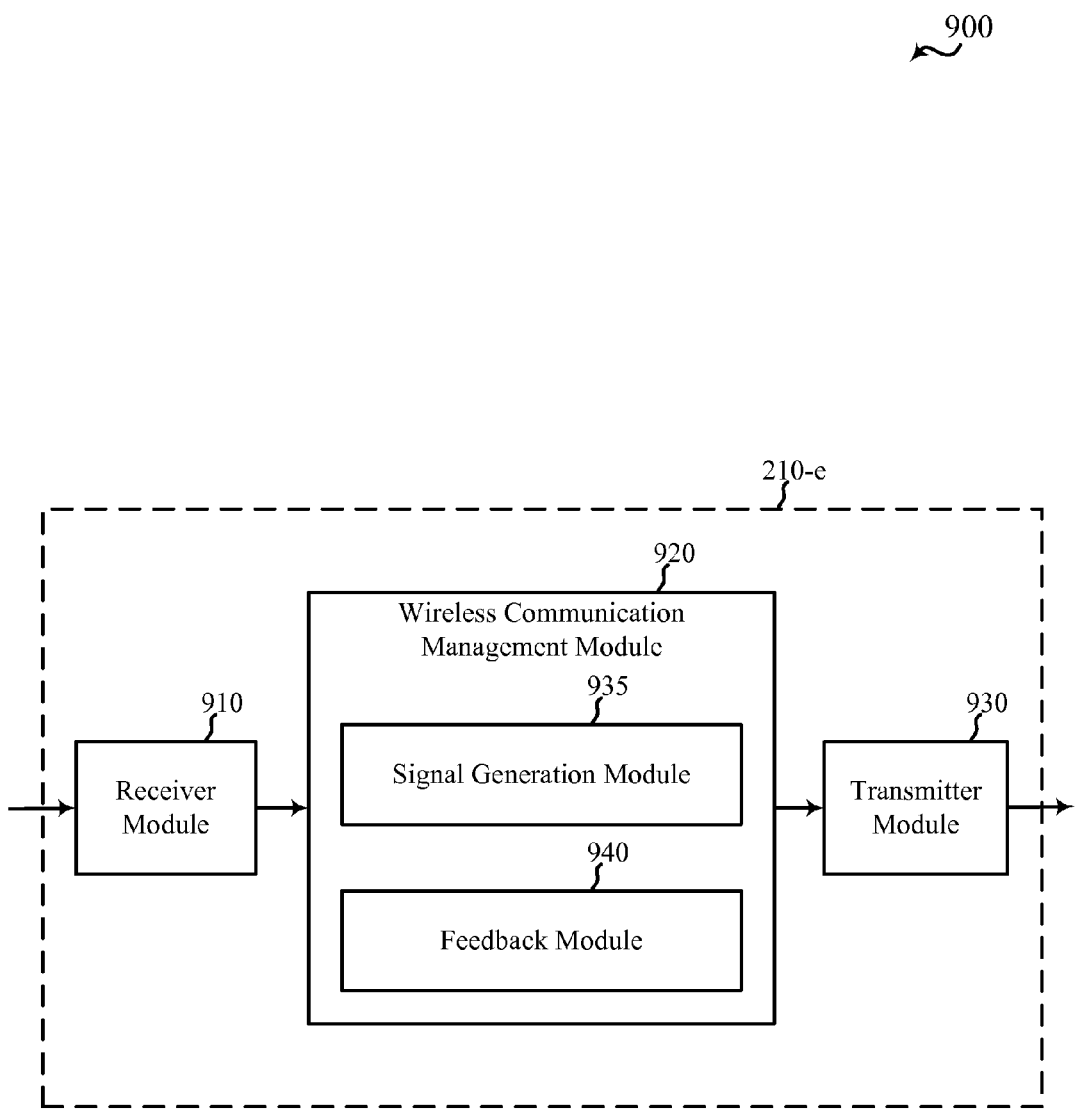
FIG. 9 shows a block diagram of a transmitting device for use in wireless communication, in accordance with various aspects of the present disclosure.

FIG. 9 shows a block diagram 900 of a transmitting device 210-e (e.g., a wireless device) for use in wireless communication, in accordance with various aspects of the present disclosure. In some examples, the transmitting device 210-e may be an example of aspects of one or more of the base stations 105 described with reference to FIG. 1, and/or aspects of one or more of the transmitting devices 210 described with reference to FIGS. 2, 3, 4, and/or 5. The transmitting device 210-e may also be a processor. The transmitting device 210-e may include a receiver module 910, a wireless communication management module 920, and/or a transmitter module 930. Each of these components may be in communication with each other.

The components of the transmitting device 210-e may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over at least one radio frequency spectrum band. In some examples, the at least one radio frequency spectrum band may be used for LTE/LTE-A communications, as described, for example, with reference to FIGS. 1, 2, and/or 3. The receiver module 910 may be used to receive various types of data and/or control signals (i.e., transmissions) over one or more transmission links of a wireless communication system, such as one or more transmission links of the wireless communication system 100, 200, and/or 300 described with reference to FIGS. 1, 2, and/or 3.

In some examples, the transmitter module 930 may include at least one RF transmitter, such as at least one RF transmitter operable to transmit over at least one radio frequency spectrum band. In some examples, the at least one radio frequency spectrum band may be used for LTE/LTE-A communications, as described, for example, with reference to FIGS. 1, 2, and/or 3. The transmitter module 930 may be used to transmit various types of data and/or control signals (i.e., transmissions) over one or more transmission links of a wireless communication system, such as one or more transmission links of the wireless communication system 100, 200, and/or 200 described with reference to FIGS. 1, 2, and/or 3.

The wireless communication management module 920 may take different forms and may be used to manage wireless communications of the transmitting device 210-e. In some examples, the wireless communication management module 920 may include a signal generation module 935 and/or a feedback module 940. Each of these components may be in communication with each other.

In some examples, the signal generation module 935 may be used to generate wireless signals for transmission to a receiving device. The wireless signals may be transmitted over a wireless channel via the transmitter module 930. In some cases, the wireless signals may be transmitted as part of one or more frames, subframes, and/or packets. In some cases, the wireless signals may include one or more messages for configuring the CSF reporting of a receiving device.

In some examples, the feedback module 940 may be used to process at least one CSF message received from a transmitting device via the receiver module 910. The at least one CSF message may provide information on a relationship of a set of parameters for a wireless channel. By way of example, the set of parameters may include a data rate parameter, an error probability parameter, and at least one of a deadline parameter or a transmission link parameter.

In some examples, the feedback module 940 may also or alternatively be used to process at least one CSF message based on a measured interference on a wireless channel. In these examples, the at least one CSF message may indicate an interfering device for the wireless channel and a correlation of interference from the interfering device with time and/or frequency.

The feedback module 940 may also be used to select or adjust at least one transmission parameter of the transmitting device 210-e when adjustment of the at least one transmission parameter is indicated by one or more of a CSF parameter, a desired transmission performance of the transmitting device 210-e, and/or HARQ feedback.

Figure 10:
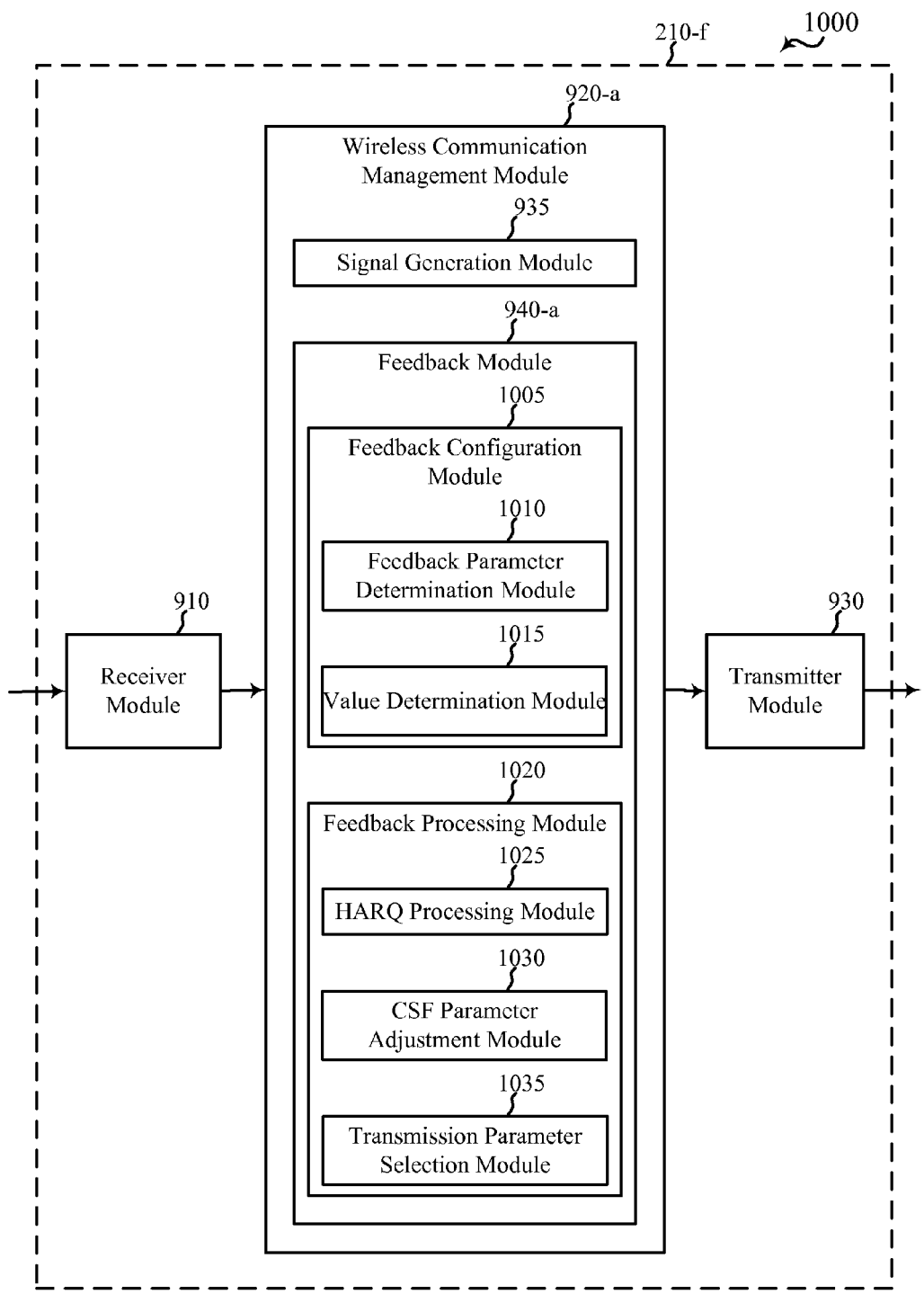
FIG. 10 shows a block diagram of a transmitting device for use in wireless communication, in accordance with various aspects of the present disclosure.

FIG. 10 shows a block diagram 1000 of a transmitting device 210-f (e.g., a wireless device) for use in wireless communication, in accordance with various aspects of the present disclosure. In some examples, the transmitting device 210-f may be an example of aspects of one or more of the base stations 105 described with reference to FIG. 1, and/or aspects of one or more of the transmitting devices 210 described with reference to FIGS. 2, 3, 4, 5, and/or 9. The transmitting device 210-f may also be a processor. The transmitting device 210-f may include a receiver module 910, a wireless communication management module 920-a, and/or a transmitter module 930. Each of these components may be in communication with each other.

The components of the transmitting device 210-f may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 and transmitter module 930 may be configured similarly to the receiver module 910 and transmitter module 930 described with reference to FIG. 9.

The wireless communication management module 920-a may take different forms and may be used to manage wireless communications of the transmitting device 210-f. In some examples, the wireless communication management module 920-a may include a signal generation module 935 and/or a feedback module 940-a. Each of these components may be in communication with each other.

In some examples, the signal generation module 935 may be configured similarly to the signal generation module 935 described with reference to FIG. 9.

In some examples, the feedback module 940-a may include a feedback configuration module 1005 and/or a feedback processing module 1020. The feedback configuration module 1005 may be used to configure the parameters for which CSF will be generated and received. In some examples, the feedback configuration module 1005 may include a feedback parameter determination module 1010 and a value determination module 1015. In some examples, the feedback parameter determination module 1010 may be used to determine a first subset of a set of parameters and a remaining subset of the set of parameters. By way of example, the set of parameters may include a data rate parameter, an error probability parameter, and at least one of a deadline parameter or a transmission link parameter. A value of each parameter in the first subset may be estimated (e.g., by a transmitting device and/or a UE) based on a given value for each parameter in the remaining subset.

In some examples, the value determination module 1015 may be used to determine a given value for each parameter in the remaining subset of parameters.

In some examples, the feedback processing module 1020 may be used to process at least one CSF message received (e.g., from a transmitting device and/or a UE) via the receiver module 910. The at least one CSF message may provide information on a relationship of the configured set of parameters for a wireless channel. In some examples, the feedback processing module 1020 may include a HARQ processing module 1025, a CSF parameter adjustment module 1030, and/or a transmission parameter selection module 1035. Each of these components may be in communication with each other.

In some examples, the HARQ processing module 1025 may be used to perform the operation(s) of block 455 in FIG. 4, the CSF parameter adjustment module 1030 may be used to perform the operation(s) of block 425 in FIG. 4, and the transmission parameter selection module 1035 may be used to perform the operation(s) of block 430 in FIG. 4.

Figure 11:
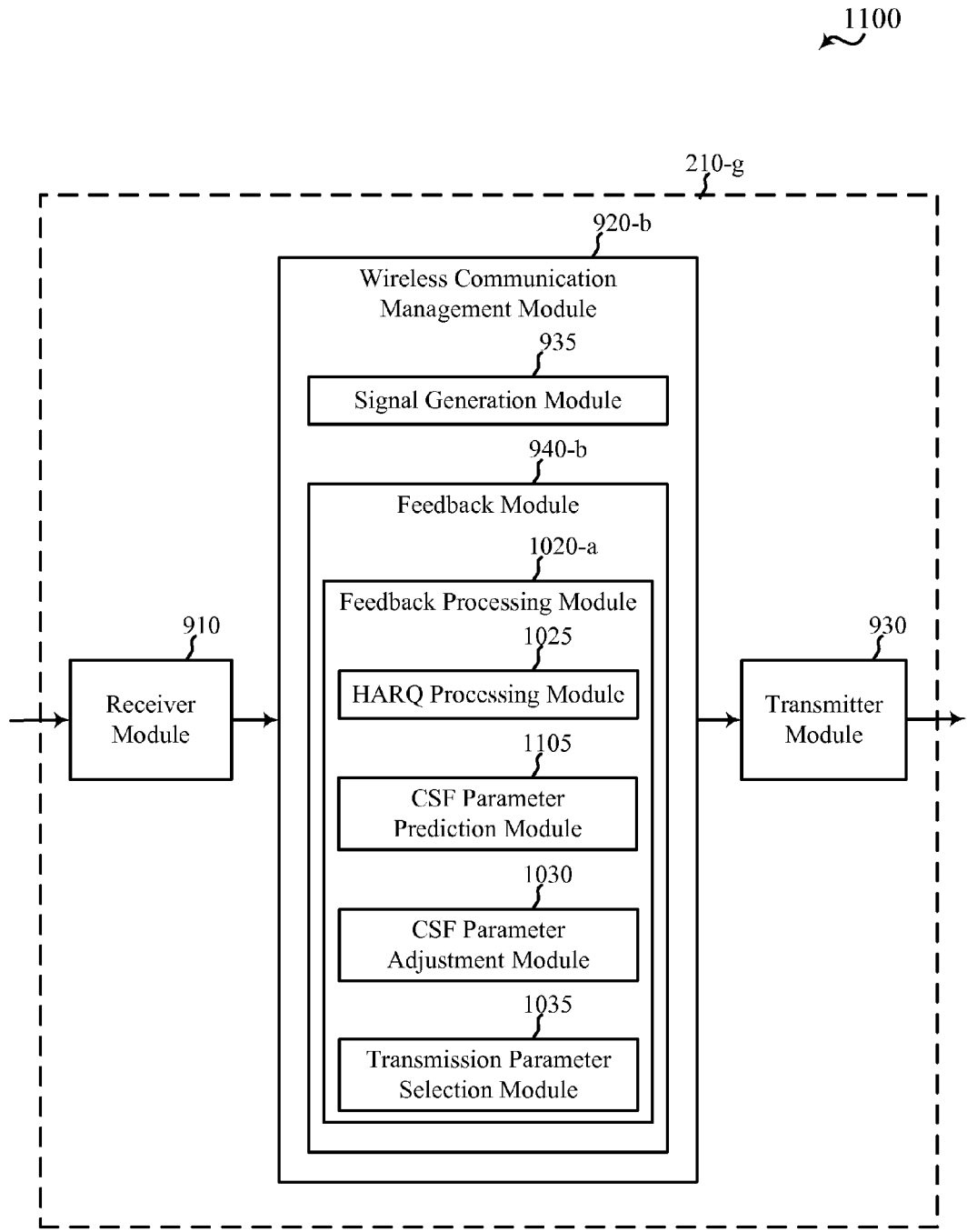
FIG. 11 shows a block diagram of a transmitting device for use in wireless communication, in accordance with various aspects of the present disclosure.

FIG. 11 shows a block diagram 1100 of a transmitting device 210-g (e.g., a wireless device) for use in wireless communication, in accordance with various aspects of the present disclosure. In some examples, the transmitting device 210-g may be an example of aspects of one or more of the base stations 105 described with reference to FIG. 1, and/or aspects of one or more of the transmitting devices 210 described with reference to FIGS. 2, 3, 4, 5, 9, and/or 10. The transmitting device 210-g may also be a processor. The transmitting device 210-g may include a receiver module 910, a wireless communication management module 920-b, and/or a transmitter module 930. Each of these components may be in communication with each other.

The components of the transmitting device 210-g may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 and transmitter module 930 may be configured similarly to the receiver module 910 and transmitter module 930 described with reference to FIG. 9.

The wireless communication management module 920-b may take different forms and may be used to manage wireless communications of the transmitting device 210-g. In some examples, the wireless communication management module 920-b may include a signal generation module 935 and/or a feedback module 940-b. Each of these components may be in communication with each other.

In some examples, the signal generation module 935 may be configured similarly to the signal generation module 935 described with reference to FIG. 9.

In some examples, the feedback module 940-b may include a feedback processing module 1020-a. The feedback processing module 1020-a may be used to process at least one CSF message received (e.g., from a transmitting device and/or a UE) via the receiver module 910. The at least one CSF message may indicate an interfering device for a wireless channel and a correlation of interference from the interfering device with time and/or frequency. In some cases, the at least one CSF message may also indicate at least one additional interfering device for the wireless channel and a correlation of the measured interference from the at least one additional interfering device with time and/or frequency. The at least one CSF message may also indicate a correlation between the measured interference from the interfering device and the measured interference from the at least one additional interfering device. In some examples, the feedback processing module 1020-a may include a HARQ processing module 1025, a CSF parameter prediction module 1105, a CSF parameter adjustment module 1030, and/or a transmission parameter selection module 1035. Each of these components may be in communication with each other.

The CSF parameter prediction module 1105 may be used to predict one or more CSF parameters based on the identity of the interfering device and/or the correlation of interference from the interfering device with time and/or frequency. The predicted CSF parameter(s) may be forwarded to the CSF parameter adjustment module 1030 and/or the transmission parameter selection module 1035, depending on the configuration of the transmitting device 210-g.

In some examples, the HARQ processing module 1025 may be used to perform the operation(s) of block 455 in FIG. 4, the CSF parameter adjustment module 1030 may be used to perform the operation(s) of block 425 in FIG. 4, and the transmission parameter selection module 1035 may be used to perform the operation(s) of block 430 in FIG. 4.

In a variation of the transmitting device 210-g described with reference to FIG. 11, the at least one CSF message may indicate a correlation of at least one CSF parameter (e.g., a data rate parameter) with time and/or frequency. The correlation with frequency may include, for example, a correlation of the at least one CSF parameter with a subband, frequency carrier, and/or frequency band. The at least one CSF message may also include an estimated periodicity of the at least one CSF parameter in time and/or frequency.

Figure 12:
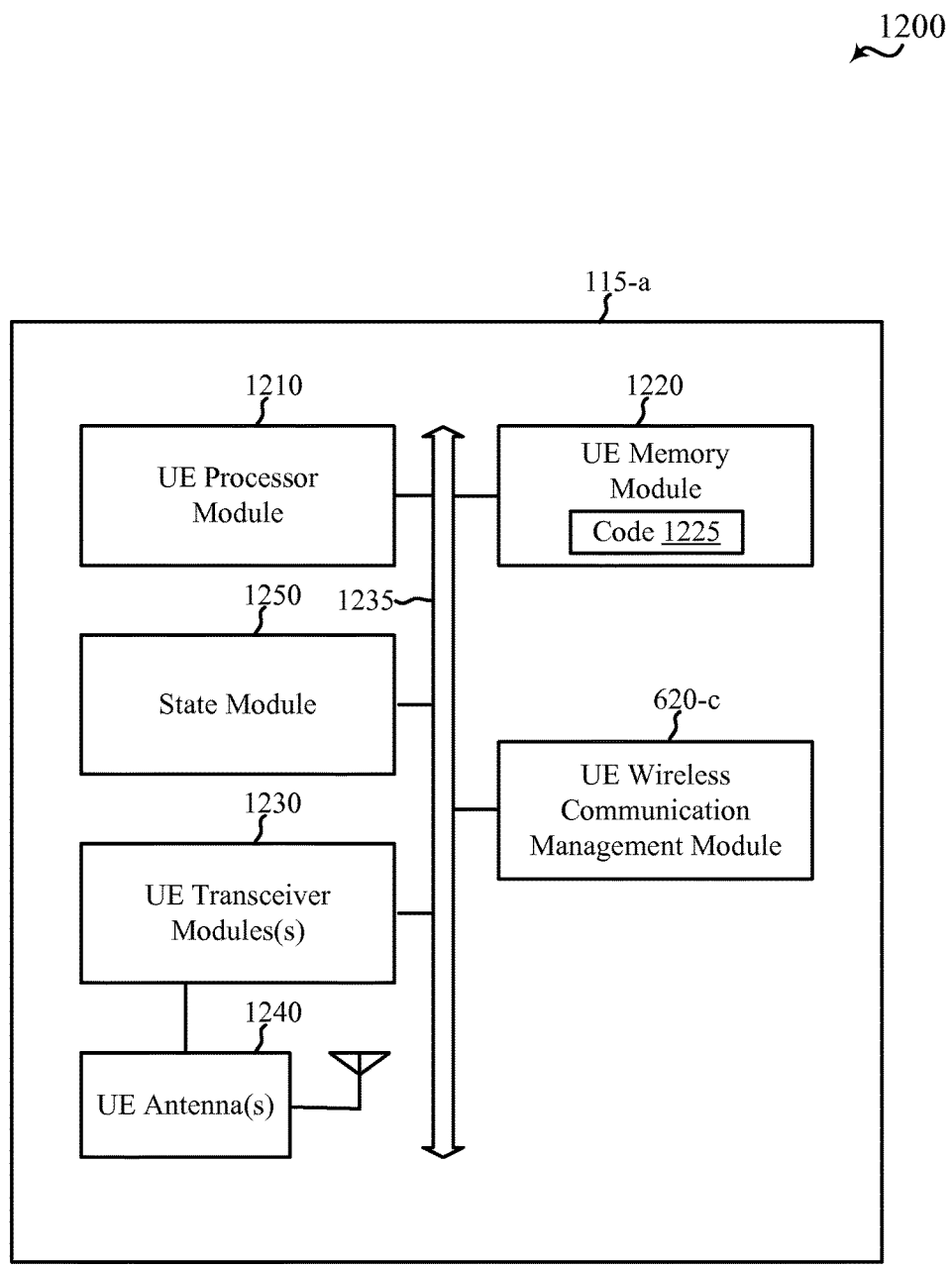
FIG. 12 shows a block diagram of a UE for use in wireless communication, in accordance with various aspects of the present disclosure.

FIG. 12 shows a block diagram 1200 of a UE 115-a for use in wireless communication, in accordance with various aspects of the present disclosure. The UE 115-a may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 115-a may, in some examples, have an internal power supply (not shown), such as a small battery, to facilitate mobile operation. In some examples, the UE 115-a may be an example of aspects of one or more of the UEs 115 described with reference to FIG. 1, and/or aspects of one or more of the receiving devices 205 described with reference to FIGS. 2, 3, 4, 5, 6,

7, and/or 8. The UE 115-a may be configured to implement at least some of the UE and/or receiving device features and functions described with reference to FIGS. 1, 2, 3, 4, 5, 6, 7, and/or 8.

The UE 115-a may include a UE processor module 1210, a UE memory module 1220, at least one UE transceiver module (represented by UE transceiver module(s) 1230), at least one UE antenna (represented by UE antenna(s) 1240), and/or a UE wireless communication management module 620-c. Each of these components may be in communication with each other, directly or indirectly, over one or more buses 1235.

The UE memory module 1220 may include random access memory (RAM) and/or read-only memory (ROM). The UE memory module 1220 may store computer-readable, computer-executable code 1225 containing instructions that are configured to, when executed, cause the UE processor module 1210 to perform various functions described herein related to wireless communication. Alternatively, the code 1225 may not be directly executable by the UE processor module 1210 but be configured to cause the UE 115-a (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 and/or information to be sent to the UE transceiver module(s) 1230 for transmission through the UE antenna(s) 1240. The UE processor module 1210 may handle, alone or in connection with the UE wireless communication management module 620-c, various aspects of communicating over (or managing communications over) at least one wireless channel.

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support communications in one or more radio frequency spectrum bands. The UE transceiver module(s) 1230 may be configured to communicate bi-directionally, via the UE antenna(s) 1240, with one or more of the base stations 105 described with reference to FIG. 1 and/or one or more of the transmitting devices 210 described with reference to FIGS. 2, 3, 4, 5, 9, 10, and/or 11. While the UE 115-a may include a single UE antenna, there may be examples in which the UE 115-a may include multiple UE antennas 1240.

The UE state module 1250 may be used, for example, to manage transitions of the UE 115-a between an RRC idle state and an RRC connected state, and may be in communication with other components of the UE 115-a, directly or indirectly, over the one or more buses 1235. The UE state module 1250, or portions of it, may include a processor, and/or some or all of the functions of the UE state module 1250 may be performed by the UE processor module 1210 and/or in connection with the UE processor module 1210.

The UE wireless communication management module 620-c may be configured to perform and/or manage some or all of the features and/or functions described with reference to FIGS. 1, 2, 3, 4, 5, 6, 7, and/or 8 related to CSF generation and transmission. The UE wireless communication management module 620-c, or portions of it, may include a processor, and/or some or all of the functions of the UE wireless communication management module 620-c may be performed by the UE processor module 1210 and/or in connection with the UE processor module 1210. In some examples, the UE wireless communication management module 620-c may be an example of the wireless communication management module 620 described with reference to FIGS. 6, 7, and/or 8.

Figure 13:
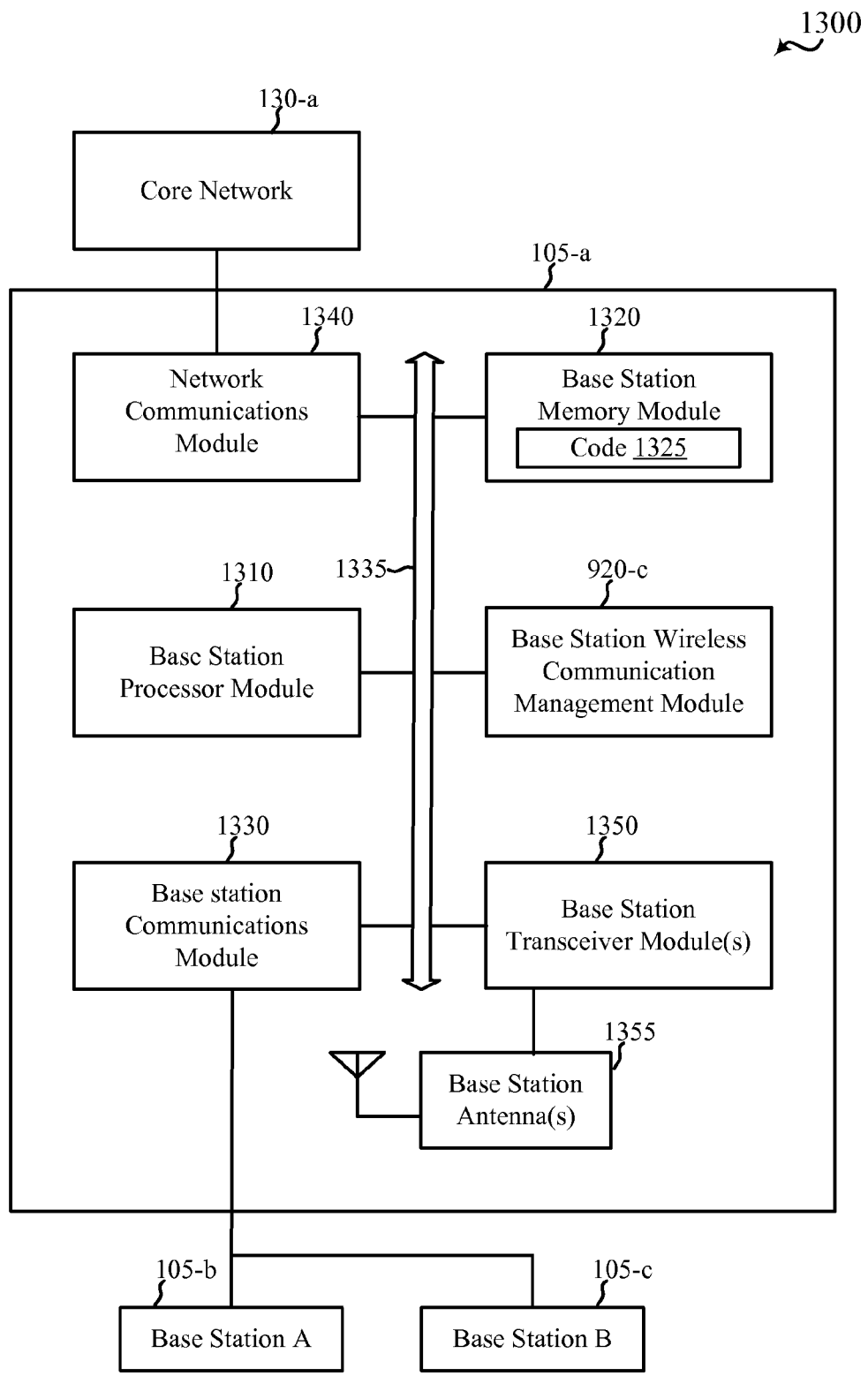
FIG. 13 shows a block diagram of a base station (e.g., a base station forming part or all of an eNB) for use in wireless communication, in accordance with various aspects of the present disclosure.

FIG. 13 shows a block diagram 1300 of a base station 105-a (e.g., a base station forming part or all of an eNB) for use in wireless communication, in accordance with various aspects of the present disclosure. In some examples, the base station 105-a may be an example of aspects of one or more of the base stations 105 described with reference to FIG. 1, and/or aspects of one or more of the transmitting devices 905 described with reference to FIGS. 9, 10, and/or 11. The base station 105-a may be configured to implement or facilitate at least some of the base station and/or transmitting device features and functions described with reference to FIGS. 1, 2, 3, 4, 5, 9, 10, and/or 11.

The base station 105-a may include a base station processor module 1310, a base station memory module 1320, at least one base station transceiver module (represented by base station transceiver module(s) 1350), at least one base station antenna (represented by base station antenna(s) 1355), and/or a base station wireless communication management module 920-c. The base station 105-a may also include one or more of a base station communications module 1330 and/or a network communications module 1340. Each of these components may be in communication with each other, directly or indirectly, over one or more buses 1335.

The base station memory module 1320 may include RAM and/or ROM. The base station memory module 1320 may store computer-readable, computer-executable code 1325 containing instructions that are configured to, when executed, cause the base station processor module 1310 to perform various functions described herein related to wireless communication. Alternatively, the code 1325 may not be directly executable by the base station processor module 1310 but be configured to cause the base station 105-a (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 105-b and 105-c, and/or to the network communications module 1340 for transmission to a core network 130-a, which may be an example of one or more aspects of the core network 130 described with reference to FIG. 1. The base station processor module 1310 may handle, alone or in connection with the base station wireless communication management module 920-c, various aspects of communicating over (or managing communications over) at least one wireless channel.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in one or more radio frequency spectrum bands. The base station transceiver module(s) 1350 may be configured to communicate bi-directionally, via the antenna(s) 1355, with one or more UEs or receiving devices, such as one or more of the UEs 115 described with reference to FIGS. 1 and/or 12, and/or one or more of the receiving devices 205 described with reference to FIGS. 2, 3, 4, 5, 6, 7, and/or 8. The base station 105-a may, for example, include multiple base station antennas 1355 (e.g., an antenna array). The base station 105-a may communicate with the core network 130-a through the network communications module 1340. The base station 105-a may also communicate with other base stations, such as the base stations 105-b and 105-c, using the base station communications module 1330.

The base station wireless communication management module 920-c may be configured to perform and/or manage some or all of the features and/or functions described with reference to FIGS. 1, 2, 3, 4, 5, 9, 10, and/or 11 related to CSF configuration and processing. The base station wireless communication management module 920-c, or portions of it, may include a processor, and/or some or all of the functions of the base station wireless communication management module 920-c may be performed by the base station processor module 1310 and/or in connection with the base station processor module 1310. In some examples, the base station wireless communication management module 920-c may be an example of the wireless communication management module 920 described with reference to FIGS. 9, 10, and/or 11.

Figure 14:
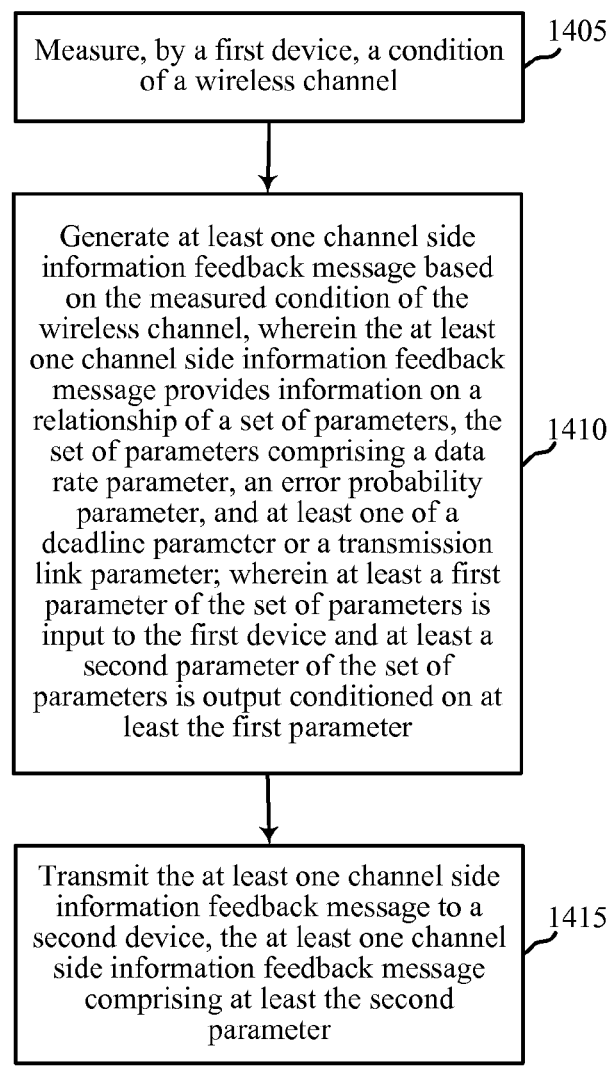
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to a first device including aspects of one or more of the UEs 115 described with reference to FIGS. 1 and/or 12, and/or aspects of one or more of the receiving devices 205 described with reference to FIGS. 2, 3, 4, 6, 7, and/or 8. In some examples a first device may execute one or more sets of codes to control the functional elements of the first device to perform the functions described below.

At block 1405, the method 1400 may include measuring, by a first device, a condition of a wireless channel. The operation(s) at block 1405 may be performed using the wireless communication management module 620 described with reference to FIGS. 6, 7, 8, and/or 12, and/or the channel measurement module 640 described with reference to FIGS. 6, 7, and/or 8.

At block 1410, the method 1400 may include generating at least one CSF message based on the measured condition of the wireless channel. The at least one CSF message may provide information on a relationship of a set of parameters. By way of example, the set of parameters may include a data rate parameter, an error probability parameter, and at least one of a deadline parameter or a transmission link parameter, and at least a first parameter of the set of parameters is input to the first device and at least a second parameter of the set of parameters is output conditioned on at least the first parameter. The operation(s) at block 1410 may be performed using the wireless communication management module 620 described with reference to FIGS. 6, 7, 8, and/or 12, the feedback module 645 described with reference to FIGS. 6, 7, and/or 8, and/or the feedback generation module 720 described with reference to FIGS. 7 and/or 8.

At block 1415, the method 1400 may include transmitting the at least one CSF message to a second device, and the at least one CSF message may include at least the second parameter. The operation(s) at block 1415 may be performed using the transmitter module 630 described with reference to FIGS. 6, 7, and/or 8.

Thus, the method 1400 may provide for wireless communication. It should be noted that the method 1400 is just one implementation and that the operations of the method 1400 may be rearranged or otherwise modified such that other implementations are possible.

Figure 15:
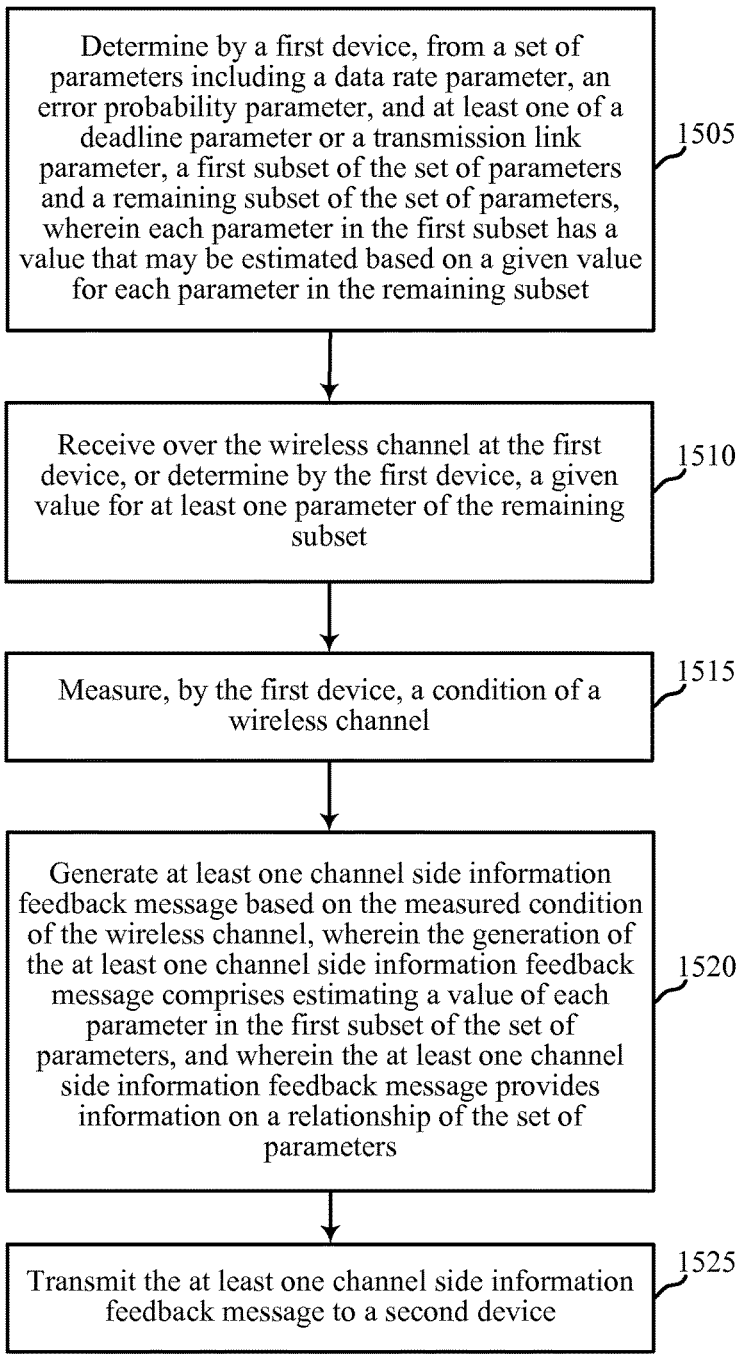
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to a first device including aspects of one or more of the UEs 115 described with reference to FIGS. 1 and/or 12, and/or aspects of one or more of the receiving devices 205 described with reference to FIGS. 2, 3, 4, 6, and/or 7. In some examples a first device may execute one or more sets of codes to control the functional elements of the first device to perform the functions described below.

At block 1505, the method 1500 may include determining, by a first device, and from a set of parameters including a data rate parameter, an error probability parameter, and at least one of a deadline parameter or a transmission link parameter, a first subset of the set of parameters and a remaining subset of the set of parameters, wherein each parameter in the first subset has a value that may be estimated based on a given value for each parameter in the remaining subset. The operation(s) at block 1505 may be performed using the wireless communication management module 620 described with reference to FIGS. 6, 7, and/or 12, the feedback module 645 described with reference to FIGS. 6 and/or 7, and/or the feedback configuration module 705 and/or feedback parameter determination module 710 described with reference to FIG. 7.

At block 1510, the method 1500 may include receiving over the wireless channel at the first device, and/or determining by the first device, a given value for at least one parameter of the remaining subset. The operation(s) at block 1510 may be performed using the wireless communication management module 620 described with reference to FIGS. 6, 7, and/or 12, the feedback module 645 described with reference to FIGS. 6 and/or 7, and/or the feedback configuration module 705 and/or value determination module 715 described with reference to FIG. 7.

At block 1515, the method 1500 may include measuring, by the first device, a condition of a wireless channel. The operation(s) at block 1515 may be performed using the wireless communication management module 620 described with reference to FIGS. 6, 7, 8, and/or 12, and/or the channel measurement module 640 described with reference to FIGS. 6, 7, and/or 8.

At block 1520, the method 1500 may include generating at least one CSF message based on the measured condition of the wireless channel. The at least one CSF message may provide information on a relationship of a set of parameters. Generating the at least one CF feedback message may include estimating a value of each parameter in the first subset of the set of parameters. In some examples, the at least one CSF message may be generated as described with reference to FIG. 4. The operation(s) at block 1520 may be performed using the wireless communication management module 620 described with reference to FIGS. 6, 7, and/or 12, the feedback module 645 described with reference to FIGS. 6 and/or 7, and/or the feedback generation module 720 described with reference to FIG. 7.

At block 1525, the method 1500 may include transmitting the at least one CSF message to a second device. The operation(s) at block 1525 may be performed using the transmitter module 630 described with reference to FIGS. 6, 7, and/or 8.

Thus, the method 1500 may provide for wireless communication. It should be noted that the method 1500 is just one implementation and that the operations of the method 1500 may be rearranged or otherwise modified such that other implementations are possible.

Figure 16:
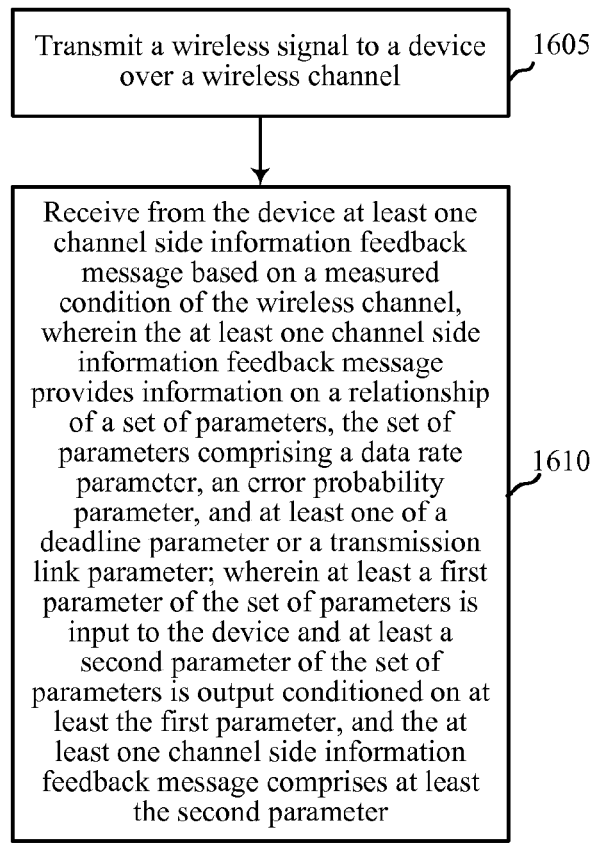
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to a first device including aspects of one or more of the base stations 105 described with reference to FIGS. 1 and/or 13, and/or aspects of one or more of the transmitting devices 210 described with reference to FIGS. 2, 3, 4, 9, 10, and/or 11. In some examples a first device may execute one or more sets of codes to control the functional elements of the first device to perform the functions described below.

At block 1605, the method 1600 may include transmitting a wireless signal to a second device over a wireless channel. The operation(s) at block 1605 may be performed using the transmitter module 930 described with reference to FIGS. 9, 10, and/or 11.

At block 1610, the method 1600 may include receiving from the second device at least one CSF message based on a measured condition of the wireless channel. The at least one CSF message may provide information on a relationship of a set of parameters. By way of example, the set of parameters may include a data rate parameter, an error probability parameter, and at least one of a deadline parameter or a transmission link parameter, and at least a first parameter of the set of parameters is input to the second device and at least a second parameter of the set of parameters is output conditioned on at least the first parameter. The at least one CSF feedback message received from the second device may include at least the second parameter. The operation(s) at block 1610 may be performed using the receiver module 910 described with reference to FIGS. 9, 10, and/or 11, and the wireless communication management module 920 described with reference to FIGS. 9, 10, 11, and/or 13, the feedback module 940 described with reference to FIGS. 9, 10, and/or 11, and/or the feedback processing module 1020 described with reference to FIGS. 10 and/or 11.

Thus, the method 1600 may provide for wireless communication. It should be noted that the method 1600 is just one implementation and that the operations of the method 1600 may be rearranged or otherwise modified such that other implementations are possible.

Figure 17:
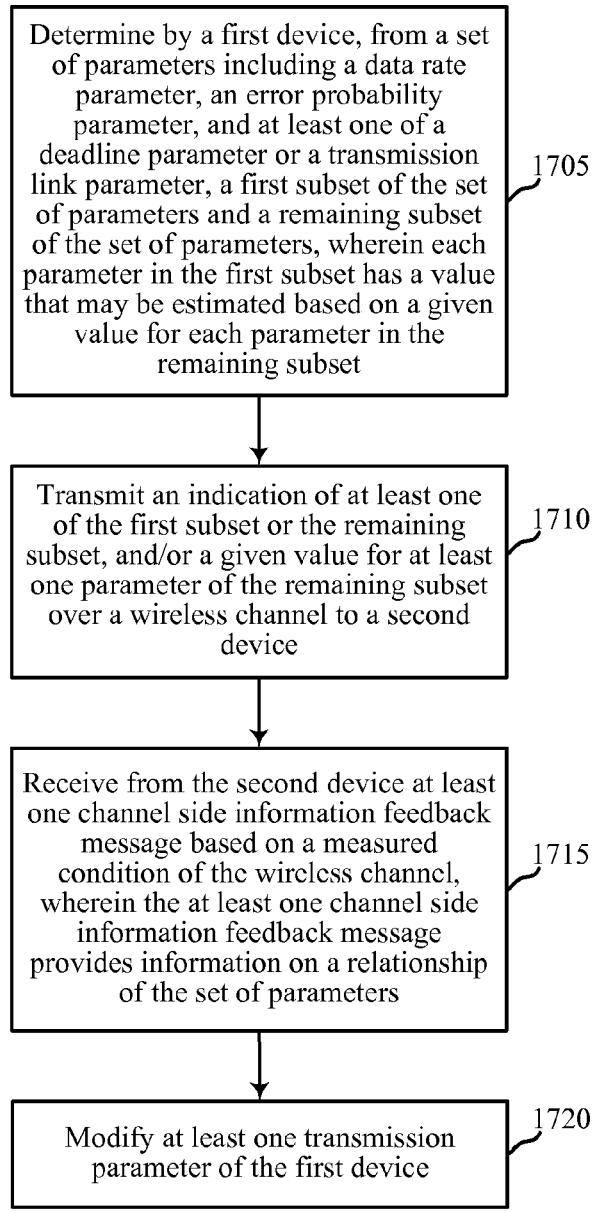
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to a first device including aspects of one or more of the base stations 105 described with reference to FIGS. 1 and/or 13, and/or aspects of one or more of the transmitting devices 210 described with reference to FIGS. 2, 3, 4, 9, and/or 10. In some examples a first device may execute one or more sets of codes to control the functional elements of the first device to perform the functions described below.

At block 1705, the method 1700 may include determining, by a first device, and from a set of parameters including a data rate parameter, an error probability parameter, and at least one of a deadline parameter or a transmission link parameter, a first subset of the set of parameters and a remaining subset of the set of parameters, wherein each parameter in the first subset has a value that may be estimated based on a given value for each parameter in the remaining subset. The operation(s) at block 17505 may be performed using the wireless communication management module 920 described with reference to FIGS. 9, 10, and/or 13, the feedback module 940 described with reference to FIGS. 9 and/or 10, and/or the feedback configuration module 1005 and/or feedback parameter determination module 1010 described with reference to FIG. 10.

At block 1710, the method 1700 may include transmitting an indication of at least one of the first subset or the remaining subset, and/or a given value for at least one parameter of the remaining subset, to a second device. The operation(s) at block 1710 may be performed using the transmitter module 930 described with reference to FIGS. 9 and/or 10.

At block 1715, the method 1700 may include receiving from the second device at least one CSF message based on a measured condition of the wireless channel. The at least one CSF message may provide information on a relationship of the set of parameters. The operation(s) at block 1715 may be performed using the receiver module 910 described with reference to FIGS. 9 and/or 10.

At block 1720, the method 1700 may include modifying at least one transmission parameter of the first device. The operation(s) at block 1720 may be performed using the wireless communication management module 920 described with reference to FIGS. 9, 10, and/or 13, the feedback module 940 described with reference to FIGS. 9 and/or 10, and/or the transmission parameter selection module 1035 described with reference to FIG. 10.

Thus, the method 1700 may provide for wireless communication. It should be noted that the method 1700 is just one implementation and that the operations of the method 1700 may be rearranged or otherwise modified such that other implementations are possible.

Figure 18:
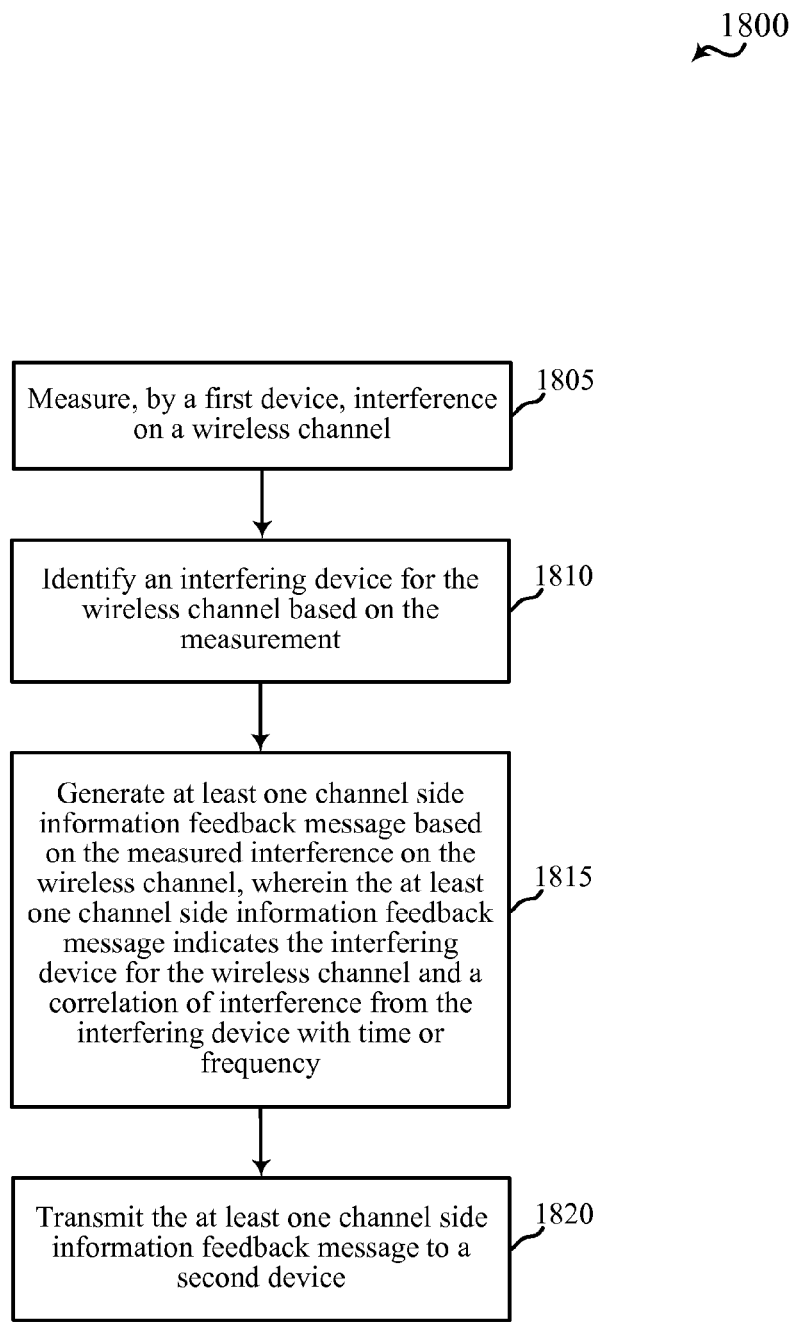
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to a first device including aspects of one or more of the UEs 115 described with reference to FIGS. 1 and/or 12, and/or aspects of one or more of the receiving devices 205 described with reference to FIGS. 2, 3, 5, 6, and/or 8. In some examples a first device may execute one or more sets of codes to control the functional elements of the first device to perform the functions described below.

At block 1805, the method 1800 may include measuring, by a first device, interference on a wireless channel. In some cases, the interference may be measured in absolute terms (e.g., in dBm) or in relative terms (e.g., dB compared to serving cell signal strength). The operation(s) at block 1805 may be performed using the wireless communication management module 620 described with reference to FIGS. 6, 8, and/or 12, and/or the channel measurement module 640 described with reference to FIGS. 6 and/or 8.

At block 1810, the method 1800 may include identifying an interfering device (e.g., a dominant interferer) for the wireless channel based on the measurement. The operation(s) at block 1810 may be performed using the wireless communication management module 620 described with reference to FIGS. 6, 8, and/or 12, and/or the interfering device identification module 805 described with reference to FIG. 8.

At block 1815, the method 1800 may include generating at least one CSF message based on the measured interference on the wireless channel. The at least one CSF message may indicate the interfering device for the wireless channel and a correlation of interference from the interfering device with time or frequency. The correlation of the interference with frequency may include, for example, a correlation of the interference with a subband, frequency carrier, and/or frequency band. In some cases, the at least one CSF message may include an identity of the interfering device. The operation(s) at block 1815 may be performed using the wireless communication management module 620 described with reference to FIGS. 6, 8, and/or 12, the feedback module 645 described with reference to FIGS. 6 and/or 8, the feedback generation module 720-a described with reference to FIG. 8, and/or the feedback time/frequency correlation module 810 described with reference to FIG. 8.

At block 1820, the method 1800 may include transmitting the at least one CSF message to a second device. The operation(s) at block 1820 may be performed using the transmitter module 630 described with reference to FIGS. 6 and/or 8.

In some examples, the method 1800 may include determining that a strength of the interference from the interfering device satisfies a threshold.

In some examples, the method 1800 may include estimating a periodicity of the interference from the interfering device in time and/or frequency. The at least one CSF message may include the estimated periodicity.

In some examples, the method 1800 may include determining a burst duration associated with the interference from the interfering device. The correlation of the interference may include the burst duration. In some examples, the burst duration may be determined by decoding a portion of an interference signal and determining the burst duration from the decoded portion of the interference signal (e.g., the burst duration may be explicitly signaled in the interference signal). In some examples, the burst duration may be estimated based on the measured interference.

In some examples, the method 1800 may also include identifying at least one additional interfering device for the wireless channel based on the measured interference. In these examples, the at least one CSF message may indicate the at least one additional interfering device for the wireless channel and a correlation of the measured interference from the at least one additional interfering device with time and/or frequency. The at least one CSF message may also indicate a correlation between the measured interference from the interfering device and the measured interference from the at least one additional interfering device.

In some examples, the method 1800 may include predicting an impact to a data rate over the wireless channel when at least one of an interference cancellation operation or a joint detection operation is performed. The at least one CSF message may then indicate a correlation of a residual interference from the interfering device with time and/or frequency.

Thus, the method 1800 may provide for wireless communication. It should be noted that the method 1800 is just one implementation and that the operations of the method 1800 may be rearranged or otherwise modified such that other implementations are possible.

Figure 19:
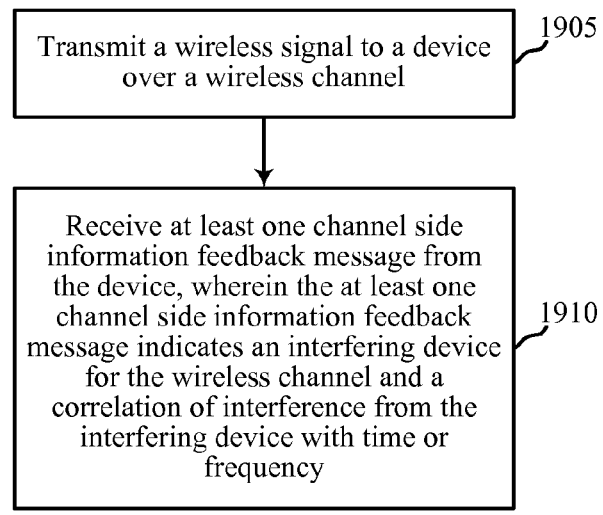
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to a first device including aspects of one or more of the base stations 105 described with reference to FIGS. 1 and/or 13, and/or aspects of one or more of the transmitting devices 210 described with reference to FIGS. 2, 3, 5, 9, and/or 11. In some examples a first device may execute one or more sets of codes to control the functional elements of the first device to perform the functions described below.

At block 1905, the method 1900 may include transmitting a wireless signal to a second device over a wireless channel. In some cases, the wireless signal may include an indication of a wireless channel for which a correlation of interference from an interfering device is to be reported to the first device. The operation(s) at block 1905 may be performed using the transmitter module 930 described with reference to FIGS. 9 and/or 11.

At block 1910, the method 1900 may include receiving from the second device at least one CSF message. The at least one CSF message may indicate an interfering device for the wireless channel and a correlation of interference from the interfering device with time and/or frequency. The operation(s) at block 1910 may be performed using the receiver module 910 described with reference to FIGS. 9 and/or 11, and the wireless communication management module 920 described with reference to FIGS. 9, 11, and/or 13, the feedback module 940 described with reference to FIGS. 9 and/or 11, and/or the feedback processing module 1020-a described with reference to FIG. 11.

In some cases, the interference may be indicated in absolute terms (e.g., in dBm) or in relative terms (e.g., dB compared to serving cell signal strength). In some cases, the at least one CSF message may include an identity of the interfering device. In some cases, the at least one CSF message may include an estimated periodicity of the interference from the interfering device in time and/or frequency. In some cases, the correlation of the interference with time may include a burst duration of the interference from the interfering device. In some cases, the correlation of the interference may include a correlation of a residual interference (e.g., interference after the performance of at least one of an interference cancellation operation or a joint detection operation) of the interfering device with time and/or frequency.

In some examples, the at least one CSF message may also indicate at least one additional interfering device for the wireless channel and a correlation of the measured interference from the at least one additional interfering device with time and/or frequency. The at least one CSF message may also indicate a correlation between the measured interference from the interfering device and the measured interference from the at least one additional interfering device.

Thus, the method 1900 may provide for wireless communication. It should be noted that the method 1900 is just one implementation and that the operations of the method 1900 may be rearranged or otherwise modified such that other implementations are possible.

Figure 20:
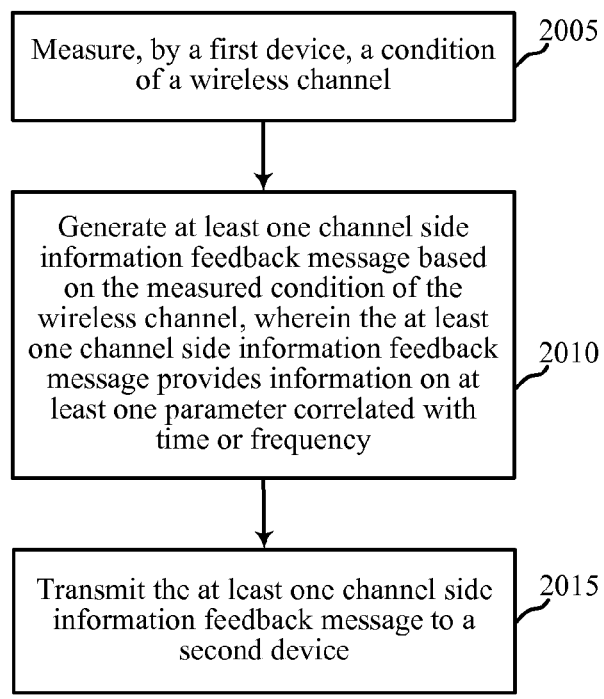
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to a first device including aspects of one or more of the UEs 115 described with reference to FIGS. 1 and/or 12, and/or aspects of one or more of the receiving devices 205 described with reference to FIGS. 2, 3, 5, 6, and/or 8. In some examples a first device may execute one or more sets of codes to control the functional elements of the first device to perform the functions described below.

At block 2005, the method 2000 may include measuring, by a first device, a condition of a wireless channel. The operation(s) at block 2005 may be performed using the wireless communication management module 620 described with reference to FIGS. 6, 8, and/or 12, and/or the channel measurement module 640 described with reference to FIGS. 6 and/or 8.

At block 2010, the method 2000 may include generating at least one CSF message based on the measured condition of the wireless channel. The at least one CSF message may provide information on at least one parameter correlated with time and/or frequency. By way of example, the at least one parameter may include a data rate parameter. By way of further example, the correlation of the interference with frequency may include, for example, a correlation of the interference with a subband, frequency carrier, and/or frequency band. The operation(s) at block 2010 may be performed using the wireless communication management module 620 described with reference to FIGS. 6, 8, and/or 12, the feedback module 645 described with reference to FIGS. 6 and/or 8, and/or the feedback generation module 720-a described with reference to FIG. 8.

At block 2015, the method 2000 may include transmitting the at least one CSF message to a second device. The operation(s) at block 2015 may be performed using the transmitter module 630 described with reference to FIGS. 6 and/or 8.

In some examples, the method 2000 may include estimating a periodicity of the at least one parameter in time and/or frequency. The CSF message may include the estimated periodicity.

Thus, the method 2000 may provide for wireless communication. It should be noted that the method 2000 is just one implementation and that the operations of the method 2000 may be rearranged or otherwise modified such that other implementations are possible.

Figure 21:
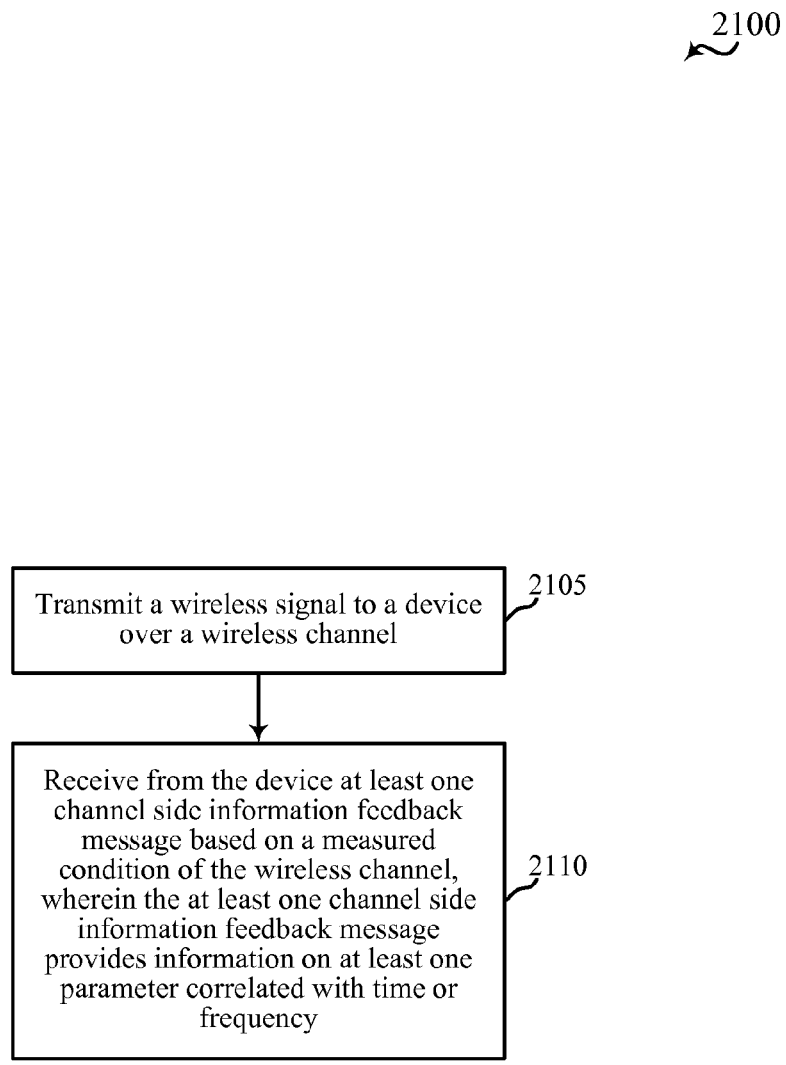
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to a first device including aspects of one or more of the base stations 105 described with reference to FIGS. 1 and/or 13, and/or aspects of one or more of the transmitting devices 210 described with reference to FIGS. 2, 3, 5, 9, and/or 11. In some examples a first device may execute one or more sets of codes to control the functional elements of the first device to perform the functions described below.

At block 2105, the method 2100 may include transmitting a wireless signal to a second device over a wireless channel. The operation(s) at block 2105 may be performed using the transmitter module 930 described with reference to FIGS. 9 and/or 11.

At block 2110, the method 2100 may include receiving from the second device at least one CSF message based on a measured condition of the wireless channel. The at least one CSF message may provide information on at least one parameter correlated with time and/or frequency. By way of example, the at least one parameter may include a data rate parameter. By way of further example, the correlation of the interference with frequency may include, for example, a correlation of the interference with a subband, frequency carrier, and/or frequency band. The operation(s) at block 2110 may be performed using the receiver module 910 described with reference to FIGS. 9 and/or 11, and the wireless communication management module 920 described with reference to FIGS. 9, 11, and/or 13, the feedback module 940 described with reference to FIGS. 9 and/or 11, and/or the feedback processing module 1020 described with reference to FIG. 11.

In some cases, the at least one CSF message may include a periodicity of the at least one parameter in time and/or frequency.

Thus, the method 2100 may provide for wireless communication. It should be noted that the method 2100 is just one implementation and that the operations of the method 2100 may be rearranged or otherwise modified such that other implementations are possible.

In some examples, aspects of two or more of the methods 1400, 1500, 1800, and/or 2000 described with reference to FIGS. 14, 15, 18, and/or 20 may be combined. In some examples, aspects of two or more of the methods 1600, 1700, 1900, and/or 2100 described with reference to FIGS. 16, 17, 19, and/or 21 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
    measuring, by a first device, a condition of a wireless channel;
    generating at least one channel side information feedback message that provides information on a relationship of a set of parameters based on the measured condition of the wireless channel, the set of parameters comprising a data rate parameter, an error probability parameter, and at least one of a deadline parameter or a transmission link parameter; wherein at least a first parameter of the set of parameters is input to the first device and at least a second parameter of the set of parameters is output conditioned on at least the first parameter; and
    transmitting the at least one channel side information feedback message to a second device, the at least one channel side information feedback message comprising at least the first parameter and at least the second parameter.

2. The method of claim 1, wherein generating the at least one channel side information feedback message comprises:
    estimating a value of each parameter in a first subset of the set of parameters based on a given value for each parameter in a remaining subset of the set of parameters.

3. The method of claim 2, further comprising:
    receiving over the wireless channel the given value for at least one parameter of the remaining subset.

4. The method of claim 2, further comprising:
    determining, by the first device, the given value for at least one parameter of the remaining subset.

5. The method of claim 2, wherein the at least one channel side information feedback message comprises an estimated value of at least one parameter of the first subset.

6. The method of claim 2, wherein the first subset comprises the data rate parameter and the remaining subset comprises the error probability parameter, the deadline parameter, and the transmission link parameter.

7. The method of claim 2, wherein the first subset comprises the error probability parameter and the remaining subset comprises the data rate parameter, the deadline parameter, and the transmission link parameter.

8. The method of claim 2, wherein the first subset comprises the deadline parameter and the remaining subset comprises the error probability parameter, the data rate parameter, and the transmission link parameter.

9. The method of claim 2, wherein the first subset comprises the transmission link parameter and the remaining subset comprises the error probability parameter, the deadline parameter, and the data rate parameter.

10. The method of claim 2, wherein the first subset comprises the data rate parameter and the transmission link parameter, and the remaining subset comprises the error probability parameter and the deadline parameter.

11. The method of claim 2, wherein the first subset comprises the data rate parameter, the deadline parameter, and the transmission link parameter, and the remaining subset comprises the error probability parameter.

12. The method of claim 2, wherein the remaining subset comprises the deadline parameter and a value of at least one parameter of the first subset is estimated for a plurality of different given values of the deadline parameter.

13. The method of claim 2, wherein the first subset comprises the error probability parameter and the value of the error probability parameter is estimated based on a plurality of different radio links.

14. The method of claim 13, further comprising:
    selecting the plurality of different radio links as a subset of all possible radio links.

15. The method of claim 13, wherein the error probability parameter is based on simultaneous transmission over the plurality of different radio links.

16. The method of claim 1, wherein the deadline parameter corresponds to a latency associated with a single retransmission of a signal.

17. A device for wireless communication, comprising:
    means for measuring a condition of a wireless channel;
    means for generating at least one channel side information feedback message that provides information on a relationship of a set of parameters based on the measured condition of the wireless channel, the set of parameters comprising a data rate parameter, an error probability parameter, and at least one of a deadline parameter or a transmission link parameter; wherein at least a first parameter of the set of parameters is input to the device and at least a second parameter of the set of parameters is output conditioned on at least the first parameter; and means for transmitting the at least one channel side information feedback message to another device, the at least one channel side information feedback message comprising at least the first parameter and at least the second parameter.

18. The device of claim 17, wherein the means for generating the at least one channel side information feedback message comprises:

means for estimating a value of each parameter in a first subset of the set of parameters based on a given value for each parameter in a remaining subset of the set of parameters.

19. The device of claim 18, further comprising:
means for receiving over the wireless channel the given value for at least one parameter of the remaining subset.

20. The device of claim 18, further comprising:
means for determining the given value for at least one parameter of the remaining subset.

21. The device of claim 18, wherein the at least one channel side information feedback message comprises an estimated value of at least one parameter of the first subset.

22. The device of claim 18, wherein the first subset comprises the data rate parameter and the remaining subset comprises the error probability parameter, the deadline parameter, and the transmission link parameter.

23. The device of claim 18, wherein the first subset comprises the error probability parameter and the remaining subset comprises the data rate parameter, the deadline parameter, and the transmission link parameter.

24. The device of claim 18, wherein the first subset comprises the deadline parameter and the remaining subset comprises the error probability parameter, the data rate parameter, and the transmission link parameter.

25. The device of claim 18, wherein the first subset comprises the transmission link parameter and the remaining subset comprises the error probability parameter, the deadline parameter, and the data rate parameter.

26. The device of claim 18, wherein the first subset comprises the data rate parameter and the transmission link parameter, and the remaining subset comprises the error probability parameter and the deadline parameter.

27. The device of claim 18, wherein the first subset comprises the data rate parameter, the deadline parameter, and the transmission link parameter, and the remaining subset comprises the error probability parameter.

28. The device of claim 18, wherein the remaining subset comprises the deadline parameter and a value of at least one parameter of the first subset is estimated for a plurality of different given values of the deadline parameter.

29. The device of claim 18, wherein the first subset comprises the error probability parameter and the value of the error probability parameter is estimated based on a plurality of different radio links.

30. The device of claim 29, further comprising:
means for selecting the plurality of different radio links as a subset of all possible radio links.

31. The device of claim 29, wherein the error probability parameter is based on simultaneous transmission over the plurality of different radio links.

32. The device of claim 17, wherein the deadline parameter corresponds to a latency associated with a single retransmission of a signal.

33. A device for wireless communication, comprising a processor, memory in electronic communication with the processor, and instructions stored in the memory, the instructions being executable by the processor to:

measure a condition of a wireless channel;

generate at least one channel side information feedback message that provides information on a relationship of a set of parameters based on the measured condition of the wireless channel, the set of parameters comprising a data rate parameter, an error probability parameter, and at least one of a deadline parameter or a transmission link parameter; wherein at least a first parameter of the set of parameters is input to the device and at least a second parameter of the set of parameters is output conditioned on at least the first parameter; and transmit the at least one channel side information feedback message to another device, the at least one channel side information feedback message comprising at least the first parameter and at least the second parameter.

34. The device of claim 33, wherein the instructions executable by the processor to generate the at least one channel side information feedback message comprise instructions executable by the processor to:

estimate a value of each parameter in a first subset of the set of parameters based on a given value for each parameter in a remaining subset of the set of parameters.

35. The device of claim 34, wherein the instructions are executable by the processor to:

receive over the wireless channel the given value for at least one parameter of the remaining subset.

36. The device of claim 34, wherein the instructions are executable by the processor to:

determining the given value for at least one parameter of the remaining subset.

37. The device of claim 34, wherein the at least one channel side information feedback message comprises an estimated value of at least one parameter of the first subset.

38. The device of claim 34, wherein the first subset comprises the data rate parameter and the remaining subset comprises the error probability parameter, the deadline parameter, and the transmission link parameter.

39. The device of claim 34, wherein the first subset comprises the data rate parameter and the transmission link parameter, and the remaining subset comprises the error probability parameter and the deadline parameter.

40. The device of claim 33, wherein the deadline parameter corresponds to a latency associated with a single retransmission of a signal.

41. A non-transitory computer-readable medium for wireless communication storing instructions executable by a processor to cause a device to:

measure a condition of a wireless channel;

generate at least one channel side information feedback message that provides information on a relationship of a set of parameters based on the measured condition of the wireless channel, the set of parameters comprising a data rate parameter, an error probability parameter, and at least one of a deadline parameter or a transmission link parameter; wherein at least a first parameter of the set of parameters is input to the device and at least a second parameter of the set of parameters is output conditioned on at least the first parameter; and transmit the at least one channel side information feedback message to another device, the at least one channel side information feedback message comprising at least the first parameter and at least the second parameter.

42. The computer-readable medium of claim 41, wherein the instructions executable by the processor to cause the device to generate the at least one channel side information feedback message comprise instructions executable by the processor to cause the device to:
estimate a value of each parameter in a first subset of the set of parameters based on a given value for each parameter in a remaining subset of the set of parameters.

43. The computer-readable medium of claim 42, wherein the instructions are executable by the processor to cause the device to:
receive over the wireless channel the given value for at least one parameter of the remaining subset.

44. A method of wireless communication, comprising:
transmitting a wireless signal to a device over a wireless channel; and
receiving from the device at least one channel side information feedback message that provides information on a relationship of a set of parameters based on a measured condition of the wireless channel, the set of parameters comprising a data rate parameter, an error probability parameter, and at least one of a deadline parameter or a transmission link parameter; wherein at least a first parameter of the set of parameters is input to the device and at least a second parameter of the set of parameters is output conditioned on at least the first parameter, and the at least one channel side information feedback message comprises at least the first parameter and at least the second parameter.

45. The method of claim 44, wherein the at least one channel side information feedback message comprises an estimated value of each parameter in a first subset of the set of parameters based on a given value for each parameter in a remaining subset of the set of parameters.

46. The method of claim 45, further comprising:
transmitting to the device an indication of at least one of the first subset or the remaining subset.

47. The method of claim 45, further comprising:
transmitting to the device the given value for at least one parameter of the remaining subset.

48. The method of claim 45, wherein the at least one channel side information feedback message comprises an estimated value of at least one parameter of the first subset.

49. The method of claim 45, wherein the first subset comprises the data rate parameter and the remaining subset comprises the error probability parameter, the deadline parameter, and the transmission link parameter.

50. The method of claim 45, wherein the first subset comprises the error probability parameter and the remaining subset comprises the data rate parameter, the deadline parameter, and the transmission link parameter.

51. The method of claim 45, wherein the first subset comprises the deadline parameter and the remaining subset comprises the error probability parameter, the data rate parameter, and the transmission link parameter.

52. The method of claim 45, wherein the first subset comprises the transmission link parameter and the remaining subset comprises the error probability parameter, the deadline parameter, and the data rate parameter.

53. The method of claim 45, wherein the first subset comprises the data rate parameter and the transmission link parameter, and the remaining subset comprises the error probability parameter and the deadline parameter.

54. The method of claim 45, wherein the first subset comprises the data rate parameter, the deadline parameter, and the transmission link parameter, and the remaining subset comprises the error probability parameter.

55. The method of claim 45, wherein the remaining subset comprises the deadline parameter and a value of at least one parameter of the first subset is estimated for a plurality of different given values of the deadline parameter.

56. The method of claim 45, wherein the first subset comprises the error probability parameter and a value of the error probability parameter is estimated based on a plurality of different radio links.

57. The method of claim 56, wherein the plurality of different radio links is a subset of all possible radio links.

58. The method of claim 56, wherein the error probability parameter is based on simultaneous transmission over the plurality of different radio links.

59. The method of claim 44, wherein the deadline parameter corresponds to a latency associated with a single retransmission of a signal.

60. A device for wireless communication, comprising:
means for transmitting a wireless signal to another device over a wireless channel; and
means for receiving from the other device at least one channel side information feedback message that provides information on a relationship of a set of parameters based on a measured condition of the wireless channel, the set of parameters comprising a data rate parameter, an error probability parameter, and at least one of a deadline parameter or a transmission link parameter; wherein at least a first parameter of the set of parameters is input to the other device and at least a second parameter of the set of parameters is output conditioned on at least the first parameter, and the at least one channel side information feedback message comprises at least the first parameter and at least the second parameter.

61. The device of claim 60, wherein the at least one channel side information feedback message comprises an estimated value of each parameter in a first subset of the set of parameters based on a given value for each parameter in a remaining subset of the set of parameters.

62. The device of claim 61, further comprising:
means for transmitting to the other device an indication of at least one of the first subset or the remaining subset.

63. The device of claim 61, further comprising:
means for transmitting to the other device the given value for at least one parameter of the remaining subset.

64. The device of claim 61, wherein the at least one channel side information feedback message comprises an estimated value of at least one parameter of the first subset.

65. The device of claim 61, wherein the first subset comprises the data rate parameter and the remaining subset comprises the error probability parameter, the deadline parameter, and the transmission link parameter.

66. The device of claim 61, wherein the first subset comprises the error probability parameter and the remaining subset comprises the data rate parameter, the deadline parameter, and the transmission link parameter.

67. The device of claim 61, wherein the first subset comprises the deadline parameter and the remaining subset comprises the error probability parameter, the data rate parameter, and the transmission link parameter.

68. The device of claim 61, wherein the first subset comprises the transmission link parameter and the remaining subset comprises the error probability parameter, the deadline parameter, and the data rate parameter.

69. The device of claim 61, wherein the first subset comprises the data rate parameter and the transmission link parameter, and the remaining subset comprises the error probability parameter and the deadline parameter.

70. The device of claim 61, wherein the first subset comprises the data rate parameter, the deadline parameter, and the transmission link parameter, and the remaining subset comprises the error probability parameter.

71. The device of claim 61, wherein the remaining subset comprises the deadline parameter and a value of at least one parameter of the first subset is estimated for a plurality of different given values of the deadline parameter.

72. The device of claim 61, wherein the first subset comprises the error probability parameter and a value of the error probability parameter is estimated based on a plurality of different radio links.

73. The device of claim 72, wherein the plurality of different radio links is a subset of all possible radio links.

74. The device of claim 72, wherein the error probability parameter is based on simultaneous transmission over the plurality of different radio links.

75. The device of claim 60, wherein the deadline parameter corresponds to a latency associated with a single retransmission of a signal.

76. A device for wireless communication, comprising a processor, memory in electronic communication with the processor, and instructions stored in the memory, the instructions being executable by the processor to:
    transmit a wireless signal to another device over a wireless channel; and
    receive from the other device at least one channel side information feedback message that provides information on a relationship of a set of parameters based on a measured condition of the wireless channel, the set of parameters comprising a data rate parameter, an error probability parameter, and at least one of a deadline parameter or a transmission link parameter; wherein at least a first parameter of the set of parameters is input to the other device and at least a second parameter of the set of parameters is output conditioned on at least the first parameter, and the at least one channel side information feedback message comprises at least the first parameter and at least the second parameter.

77. The device of claim 76, wherein the at least one channel side information feedback message comprises an estimated value of each parameter in a first subset of the set of parameters based on a given value for each parameter in a remaining subset of the set of parameters.

78. The device of claim 77, wherein the instructions are executable by the processor to:
    transmit to the other device an indication of at least one of the first subset or the remaining subset.

79. The device of claim 77, wherein the instructions are executable by the processor to:
    transmit to the other device the given value for at least one parameter of the remaining subset.

80. The device of claim 77, wherein the at least one channel side information feedback message comprises an estimated value of at least one parameter of the first subset.

81. The device of claim 77, wherein the first subset comprises the data rate parameter and the remaining subset comprises the error probability parameter, the deadline parameter, and the transmission link parameter.

82. The device of claim 77, wherein the first subset comprises the data rate parameter and the transmission link parameter, and the remaining subset comprises the error probability parameter and the deadline parameter.

83. The device of claim 76, wherein the deadline parameter corresponds to a latency associated with a single retransmission of a signal.

84. A non-transitory computer-readable medium for wireless communication storing instructions executable by a processor to cause a device to:
    transmit a wireless signal to another device over a wireless channel; and
    receive from the other device at least one channel side information feedback message that provides information on a relationship of a set of parameters based on a measured condition of the wireless channel, the set of parameters comprising a data rate parameter, an error probability parameter, and at least one of a deadline parameter or a transmission link parameter; wherein at least a first parameter of the set of parameters is input to the other device and at least a second parameter of the set of parameters is output conditioned on at least the first parameter, and the at least one channel side information feedback message comprises at least the first parameter and at least the second parameter.

85. The computer-readable medium of claim 84, wherein the at least one channel side information feedback message comprises an estimated value of each parameter in a first subset of the set of parameters based on a given value for each parameter in a remaining subset of the set of parameters.

86. The computer-readable medium of claim 85, wherein the instructions are executable by the processor to:
    transmit to the device an indication of at least one of the first subset or the remaining subset.

87. The computer-readable medium of claim 85, wherein the instructions are executable by the processor to cause the device to:
    transmit to the other device the given value for at least one parameter of the remaining subset.

* * * * *